US010185718B1

(12) United States Patent
Wilkinson et al.

(10) Patent No.: US 10,185,718 B1
(45) Date of Patent: Jan. 22, 2019

(54) INDEX COMPRESSION AND DECOMPRESSION

(71) Applicant: The Nielsen Company (US), LLC, New York, NY (US)

(72) Inventors: Matthew James Wilkinson, Emeryville, CA (US); Steven D. Scherf, Oakland, CA (US); Andreas Schmidt, San Pablo, CA (US); Jeffrey Scott, Berkeley, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 15/683,891

(22) Filed: Aug. 23, 2017

(51) Int. Cl.
*G06F 17/30* (2006.01)

(52) U.S. Cl.
CPC .... *G06F 17/3002* (2013.01); *G06F 17/30312* (2013.01)

(58) Field of Classification Search
CPC .................. G06F 17/3002; G06F 17/30312
USPC .......................................................... 708/203
See application file for complete search history.

(56) References Cited

U.S. PATENT DOCUMENTS

| 4,608,664 | A | * | 8/1986 | Bartlett | .................... | G06F 17/25 |
| | | | | | | 358/1.2 |
| 4,802,232 | A | | 1/1989 | Aites | | |
| 4,888,806 | A | * | 12/1989 | Jenkin | ..................... | G10L 25/00 |
| | | | | | | 381/85 |
| 5,016,009 | A | | 5/1991 | Whiting et al. | | |
| 5,553,193 | A | | 9/1996 | Akagiri | | |
| 6,266,419 | B1 | | 7/2001 | Lacy et al. | | |
| 7,403,565 | B2 | * | 7/2008 | Reitmeier | ........ | H04N 21/23614 |
| | | | | | | 375/240.16 |
| 8,117,361 | B2 | | 2/2012 | De Peuter et al. | | |
| 8,787,615 | B2 | | 7/2014 | Srinivasan | | |
| 9,584,155 | B1 | | 2/2017 | Gopal et al. | | |
| 9,608,665 | B2 | | 3/2017 | Liaghati | | |

(Continued)

FOREIGN PATENT DOCUMENTS

WO          9609618          3/1996

OTHER PUBLICATIONS

Cano, Pedro et al., "A Review of Algorithms for Audio Fingerprinting," University of Pompeu Fabra, 2002, 5 pages.

(Continued)

*Primary Examiner* — Tan V Mai
(74) *Attorney, Agent, or Firm* — Hanley, Flight & Zimmerman, LLC

(57) ABSTRACT

A machine can compress an entry of an index, starting with accessing first data that corresponds to a segment of content and is expressed in a first number of bits. The machine classifies the content into a first class or a second class and generates second data that is expressed in a fewer, second number of bits. To generate an upper portion of the second data, the machine selects and executes one of two algorithms based on the class of the content. The machine then assigns the generated second data to the segment. To decompress the second data and thereby recover the first data, the machine parses upper and lower portions of the second data, determines the class of the content, and recovers upper and lower portions of the first data. The upper portion is recovered via one of two algorithms based on the class of the content.

20 Claims, 14 Drawing Sheets

(56) References Cited

U.S. PATENT DOCUMENTS

| | | | |
|---|---|---|---|
| 2001/0046298 A1* | 11/2001 | Terada | G06T 1/0021 |
| | | | 380/252 |
| 2003/0038803 A1* | 2/2003 | Morein | G06T 15/405 |
| | | | 345/421 |
| 2008/0291295 A1* | 11/2008 | Kato | H04N 19/124 |
| | | | 348/231.99 |
| 2009/0132243 A1* | 5/2009 | Suzuki | G10L 21/04 |
| | | | 704/216 |
| 2009/0267810 A1 | 10/2009 | Schneider | |
| 2014/0108362 A1 | 4/2014 | Kim et al. | |
| 2016/0336963 A1 | 11/2016 | Harnik et al. | |
| 2017/0163985 A1 | 6/2017 | Berenger | |

OTHER PUBLICATIONS

Mozina, Martin et al., "Nomograms for Visualization of Naive Bayesian Classifier," Faculty of Computer and Information Science, University of Ljubljana, Slovenia, 2004, 12 pages.

* cited by examiner

INDEX COMPRESSION AND DECOMPRESSION

TECHNICAL FIELD

The subject matter disclosed herein generally relates to the technical field of special-purpose machines that facilitate data management, data indexing, and data retrieval, including software-configured computerized variants of such special-purpose machines and improvements to such variants, and to the technologies by which such special-purpose machines become improved compared to other special-purpose machines that facilitate data management and retrieval. Specifically, the present disclosure addresses systems and methods to facilitate index compression, index decompression, or both.

BACKGROUND

For purposes of data management, data retrieval, or both, a machine (e.g., a server machine or cloud of server machine) may be configured to index data (e.g., data records). Since one or more indices that result from such indexing of data may become awkwardly large or otherwise cumbersome to efficiently store, access, search, or any suitable combination thereof, such indices may be compressed for greater efficiency in performing one or more of these functions.

BRIEF DESCRIPTION OF THE DRAWINGS

Some embodiments are illustrated by way of example and not limitation in the figures of the accompanying drawings.

DETAILED DESCRIPTION

Figure 1:
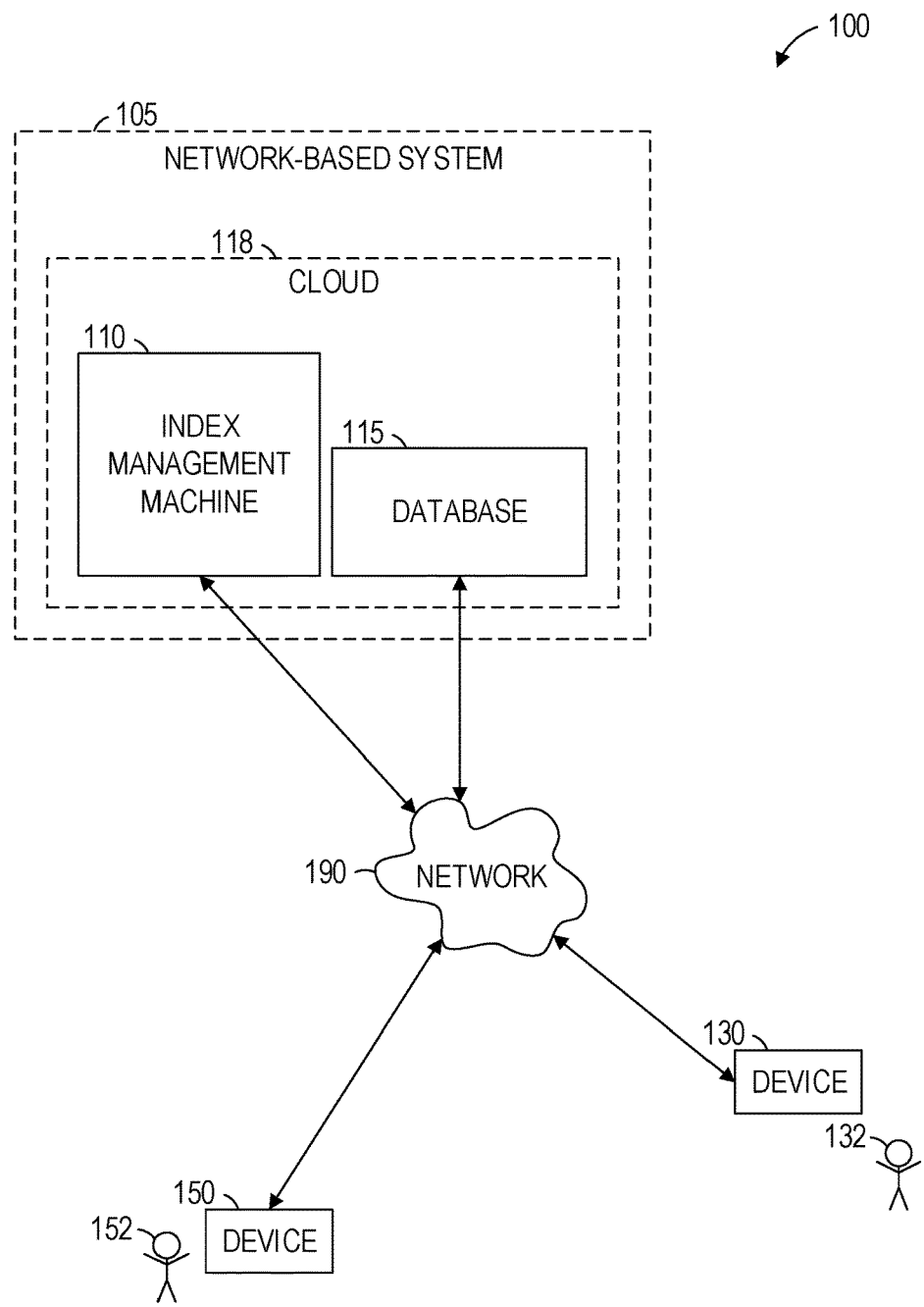
FIG. 1 is a network diagram illustrating a network environment suitable for index compression and decompression, according to some example embodiments.

Example methods (e.g., algorithms) facilitate index compression, index decompression, or both, and example systems (e.g., special-purpose machines configured by special-purpose software) are configured to facilitate index compression, index decompression, or both. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A machine (e.g., server machine) can be configured (e.g., by suitable software modules, such as those discussed herein) to perform full or partial compression of an index within a database. For example, the machine can be configured to fully or partially compress a hash table (e.g., stored in the database) that relates segments of content (e.g., media content) to respective corresponding data for those segments (e.g., digital fingerprints of the segments). Such compression may be performed on an entry-by-entry basis within the database (e.g., for each entry within the hash table), starting with the machine accessing first data that corresponds to a segment of content and is expressed in a first number of bits, where an upper portion of this first number of bits has a first data type (e.g., an identifier of the content), and where a lower portion of this first number of bits has a second data type (e.g., an identifier of the segment within the content). The machine classifies the content into either a first binary class or a second binary class and then compresses the first data by generating second data based on the first data.

The second data to be generated is or will be expressed in the second number of bits that are fewer than the first number of bits. In generating the second data, the machine selects one of two algorithms based on the determined binary class of the content. Specifically, if the content was classified into the first binary class, the machine generates a first upper portion of the second number of bits by subtracting the upper portion of the first number of bits from a maximum possible value representable by the second number of bits. Alternatively, the machine may generate the first upper portion of the second number of bits by adding the upper portion of the first number of bits to a minimum possible value representable by the second number of bits, to a pre-determined value representable by the second number of bits, or to any other value based on the first data, the second data, etc., and/or a combination thereof. For example, the first upper portion of the second number of bits may have a predetermined size (e.g., a first size, measured in bits). Otherwise, if the content was classified into the second binary class, the machine generates a different, second upper portion of the second number of bits by adding the upper portion of the first number of bits to a minimum possible value representable by the second number of bits. Alternatively, the machine may generate the second upper portion of the second number of bits by subtracting the upper portion of the first number of bits to from a maximum possible value representable by the second number of bits, from a pre-determined value representable by the second number of bits, or from any other value based on the first data, the second data, etc., and/or a combination thereof. For example, the second upper portion of the second number of bits may also have its own predetermined size (e.g., a second size, measured in bits).

Once the second data has been generated, the machine assigns the second data to the segment of content (e.g., by creating a link, pointer, or other reference between the generated second data and the segment of content, or between identifiers thereof, within the database). In the generated and assigned second data, the upper portion (e.g., first upper portion or second upper portion) of the second number of bits may have the first data type, and the lower portion of the second number of bits may have the second data type. Furthermore, the lower portion may have a predetermined size (e.g., a third size, measured in bits).

To decompress a previously compressed entry within the database, the machine accesses the compressed entry (e.g., now renamed as first data) of the database (e.g., a post-compression hash table entry) and parses it into its upper and lower portions as noted, the upper portion has the first data type, and the lower portion has a second data type. Moreover, the upper portion may have one of two predetermined sizes (e.g., the above-mentioned first or second sizes). Overall, the compressed entry is expressed in a number of bits (e.g., now renamed as a first number of bits). The machine determines the binary class (e.g., first or second) of the content based on the size (e.g., first or second) of the upper portion of the compressed entry.

Based on the determined binary class of the content, the machine then recovers the upper portion of the uncompressed entry, which will be expressed in a different number of bits (e.g., now renamed as a second number of bits), by selecting and executing one of two algorithms based on the determined binary class of the content. Specifically, if the content has the first binary class, the machine subtracts the upper portion of the compressed entry from a maximum possible value representable by the first number of bits (e.g., a maximum value representable by the compressed entry's size, as measured in bits). Otherwise, if the content has the second binary class, the machine subtracts a minimum possible value representable by the first number of bits (e.g., zero or some other minimum value representable by the compressed entry's size, as measured in bits) from the upper portion of the compressed entry. The machine also recovers the lower portion of the uncompressed entry based on the lower portion of the compressed entry. Having recovered both the upper and lower portions of the uncompressed entry (e.g., in the hash table stored in the database), the decompression of the compressed entry may accordingly be deemed to be complete.

FIG. 1 is a network diagram illustrating a network environment 100 suitable for index compression, index decompression, or both, according to some example embodiments. The network environment 100 includes an index management machine 110, a database 115, and devices 130 and 150, all communicatively coupled to each other via a network 190. The index management machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the devices 130 and 150). The index management machine 110, the database 115, and the devices 130 and 150 may each be implemented in a special-purpose (e.g., specialized) computer system, in whole or in part, as described below with respect to FIG. 14. As noted above, the index management machine 110 may be configured to perform full or partial compression of the database 115 (e.g., full or partial compression of a hash table stored in the database 115), full or partial decompression of the database 115 (e.g., full or partial decompression of the hash table), or any suitable combination thereof.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 14, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., a graphic database, an object-relational database, etc.), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the index management machine 110 and the database 115, or between the index management machine and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
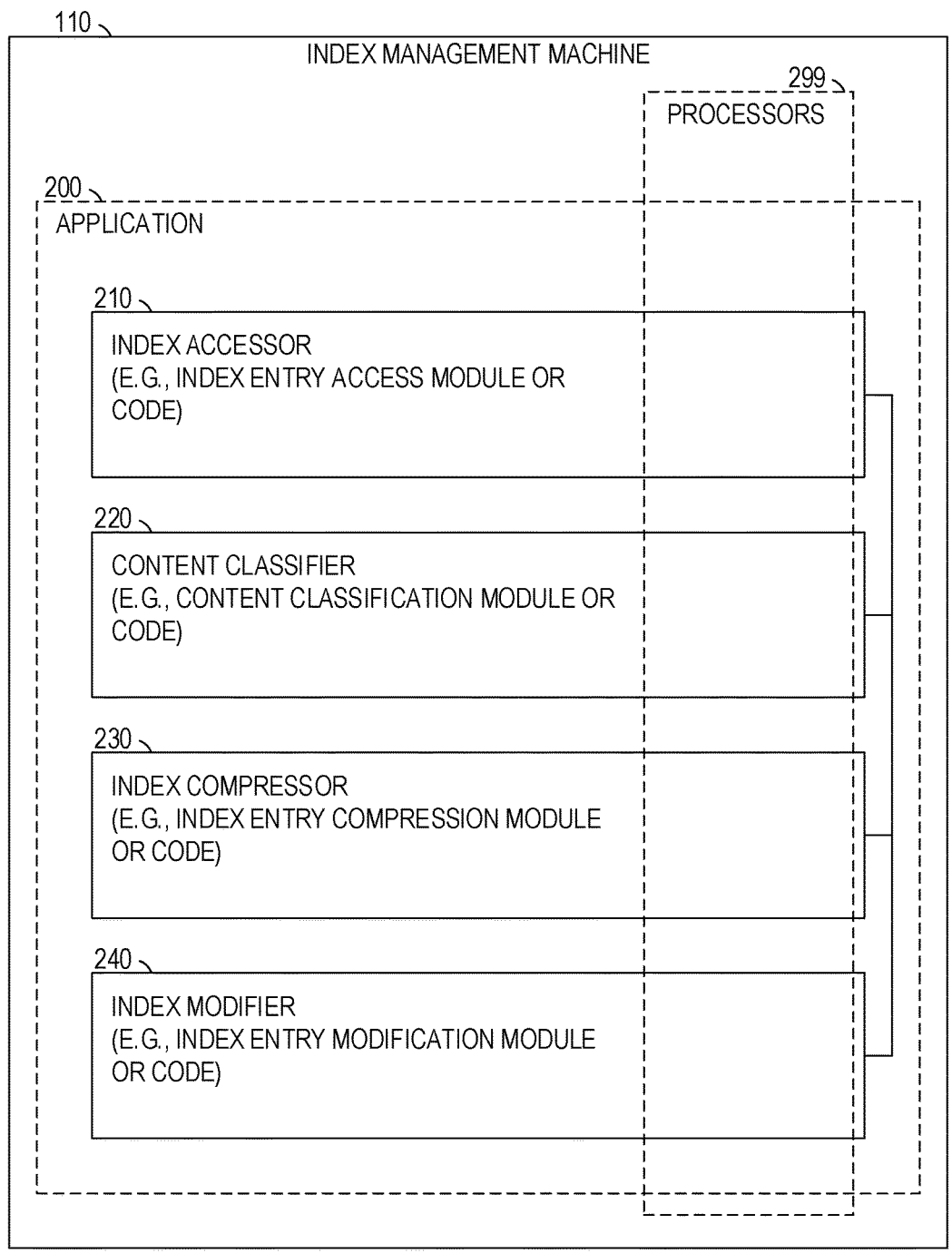
FIG. 2 is a block diagram illustrating components of an index management machine configured for index compression, inter alia, according to some example embodiments.

FIG. 2 is a block diagram illustrating components of the index management machine 110 when configured for index compression, inter alia, according to some example embodiments. The index management machine 110 is shown as including an index accessor 210, a content classifier 220, an index compressor 230, and an index modifier 240, all configured to communicate with each other (e.g., via a bus, shared memory, or a switch). The index accessor 210 may be or include an index entry access module or other suitable software code for accessing one or more entries of an index (e.g., pre-compression entries). The content classifier 220 may be or include a content classification module or other suitable software code for classifying content. The index compressor 230 may be or include an index entry compression module or other suitable software code for compressing one or more entries of an index. The index modifier 240 may be or include an index entry modification module or other suitable software code for modifying one or more entries of an index.

As shown in FIG. 2, the index accessor 210, the content classifier 220, the index compressor 230, the index modifier 240, or any suitable combination thereof, may form all or part of an application 200 (e.g., a server-side application, a client-side application, a mobile app, or any suitable combination thereof) that is stored (e.g., installed) on the index management machine 110. Furthermore, one or more processors 299 (e.g., hardware processors, digital processors, or any suitable combination thereof) may be included (e.g., temporarily or permanently) in the application 200, the index accessor 210, the content classifier 220, the index compressor 230, the index modifier 240, or any suitable combination thereof.

Figure 3:
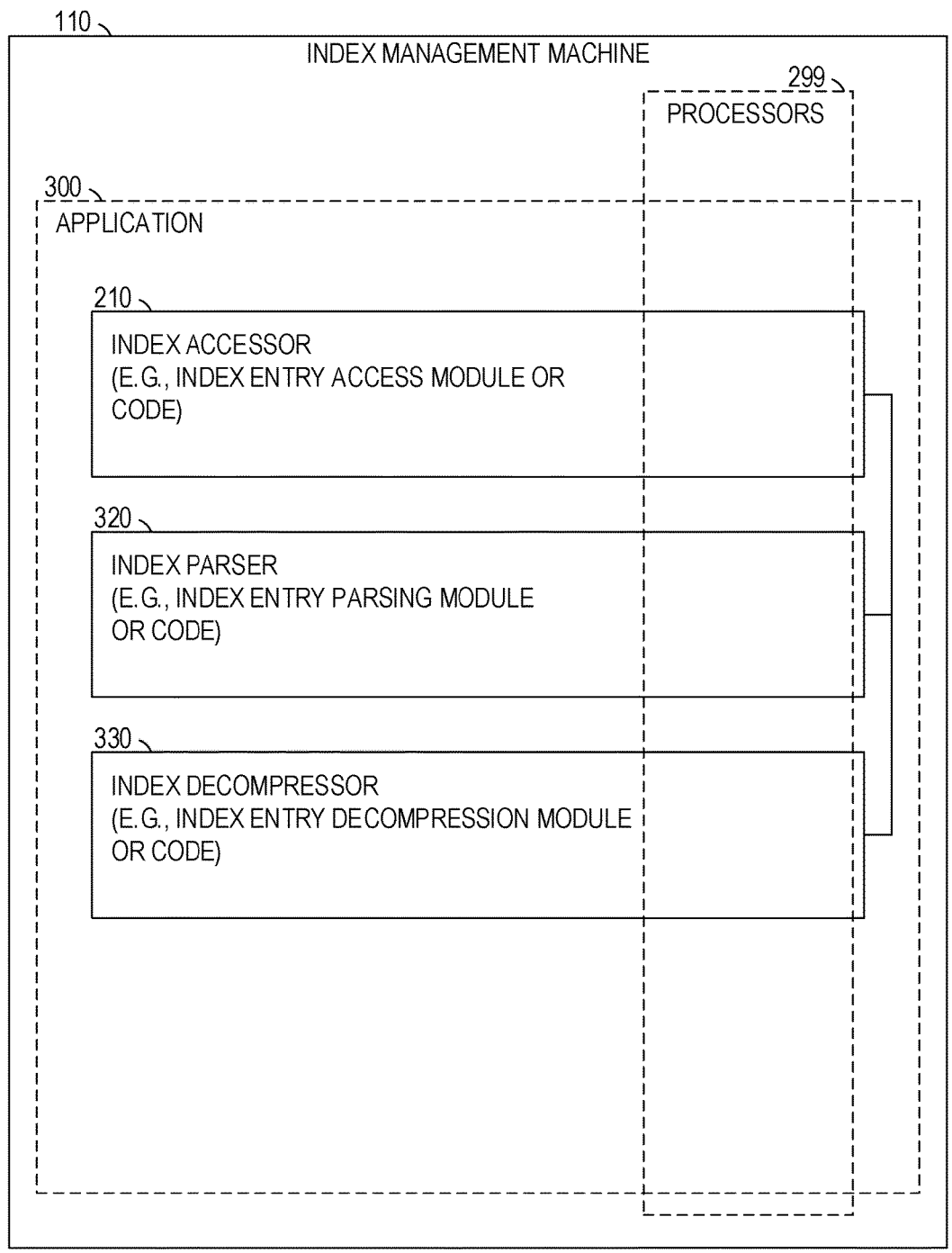
FIG. 3 is a block diagram illustrating components of the index management machine configured for index decompression, inter alia, according to some example embodiments.

FIG. 3 is a block diagram illustrating components of the index management machine 110 when configured for index decompression, inter alia, according to some example embodiments. The index management machine 110 is shown as including the index accessor 210, an index parser 320, and an index decompressor 330, all configured to communicate with each other (e.g., via a bus, shared memory, or a switch). As noted above, the index accessor 210 may be or include an index entry access module or other suitable software code for accessing one or more entries of an index (e.g., post-compression entries). The index parser 320 may be or include an index entry parsing module or other suitable software code for parsing one or more previously compressed entries of an index. The index decompressor 330 may be or include an index entry decompression module or other suitable software code for decompressing one or more previously compressed entries of an index.

As shown in FIG. 3, the index accessor 210, the index parser 320, the index decompressor 330, or any suitable combination thereof, may form all or part of an application 300 (e.g., a server-side application, a client-side application, a mobile app, or any suitable combination thereof) that is stored (e.g., installed) on the index management machine 110. Furthermore, one or more processors 299 (e.g., hardware processors, digital processors, or any suitable combination thereof) may be included (e.g., temporarily or permanently) in the application 300, the index accessor 210, the index parser 320, the index decompressor 330, or any suitable combination thereof.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 4:
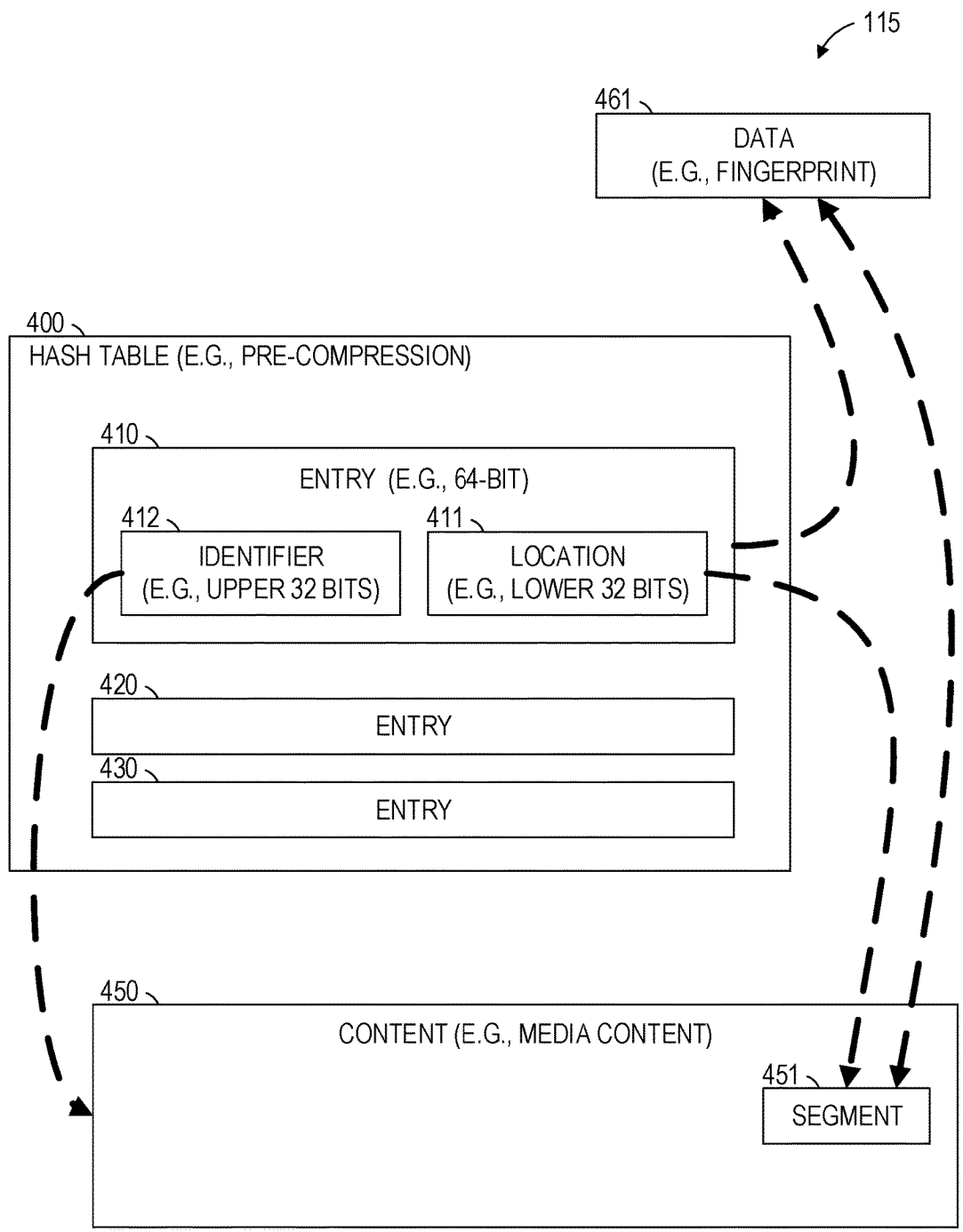
FIG. 4 is a conceptual diagram illustrating entries in a hash table and relationships among an entry within the hash table to a segment of content and data that corresponds to the segment of content, according to some example embodiments.

FIG. 4 is a conceptual diagram illustrating contents of the database 115, including entries 410, 420, and 430 in a hash table 400, as well as relationships among the entry 410, a corresponding segment 451 of content 450, and corresponding data 461 (e.g., a fingerprint of the segment 451), according to some example embodiments. The database 115 is shown as storing the data 461 (e.g., the fingerprint), the hash table 400, and the content 450, though in various example embodiments, the database 115 instead stores one or more corresponding identifiers or other references thereto.

As shown in FIG. 4, the hash table 400 may be in a pre-compression state (e.g., prior to being compressed according to one or more of the methodologies described herein). The entry 410 within the hash table 400 includes two portions, specifically, an identifier 412 and a location 411. The identifier 412 may be an upper portion of the entry 410, and the location 411 may be a lower portion of the entry 410. For example, the entry 410 may be a 64-bit value, and the identifier 412 may be the upper 32 bits of the 64-bit value of the entry 410, while the location 411 may be the lower 32 bits of the 64-bit value of the entry 410.

The content 450 may take the example form of media content (e.g., digital media content, such as an audio track (e.g., a song), a video track (e.g., a movie), or any suitable combination thereof. Accordingly, the segment 451 of the content 450 may take the example form of a time-based portion of the content 450 (e.g., a half-second duration of audio samples or a frame of video).

As shown by a dashed arrow in FIG. 4, the identifier 412 in the entry 410 is associated with (e.g., correlated with or assigned to) the content 450. For example, the identifier 412 may identify, indicate, specify, or otherwise reference the content 450. As illustrated by another dashed arrow in FIG. 4, the location 411 in the entry 410 is associated with the segment 451 within the content 450. For example, the location 411 may identify, indicate, specify, or otherwise reference the segment 451 (e.g., by identifying, indicating, specifying, or otherwise referencing an offset position occupied by the segment 451 within the content 450). As illustrated by a further dashed arrow in FIG. 4, the location 411 is also associated with the data 461 (e.g., the fingerprint) that corresponds to the segment 451. As an example, the database 115 may link, map, assign, or otherwise correlate the data 461 with the entry 410 or any portion thereof (e.g., the location 411). An additional dashed arrow in FIG. 4 shows that the segment 451 is associated with the data 461, and the database 115 may link, map, assign, or otherwise correlate the data 461 with the segment 451 of the content 450.

Other entries 420 and 430 within the hash table 400 may be configured similarly. For example, the entries 420 and 430 may each include a respective corresponding identifier (e.g., similar to the identifier 412) and a respective corresponding location (e.g., similar to the location 411), and the entries 420 and 430 may each be correlated (e.g., by the database 115) with a respective corresponding segment (e.g., similar to the segment 451) of the content 450, as well as correlated (e.g., by the database 115) with respective corresponding data (e.g., similar to the data 461) associated with the corresponding segment.

Figure 5:
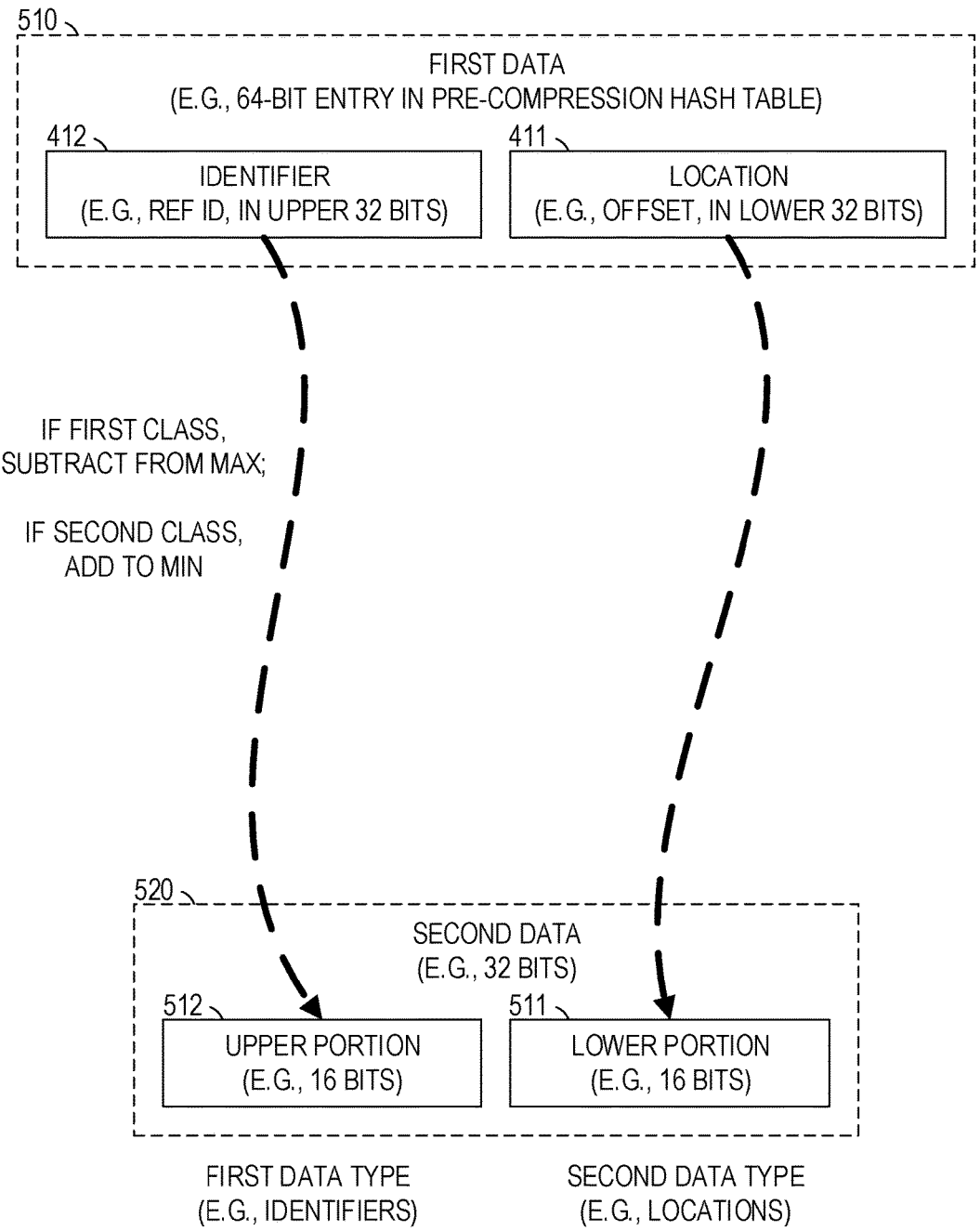
FIGS. 5-7 are conceptual diagrams illustrating example relationships among information included in pre-compression first data and in post-compression second data, according to some example embodiments.
Figure 6:
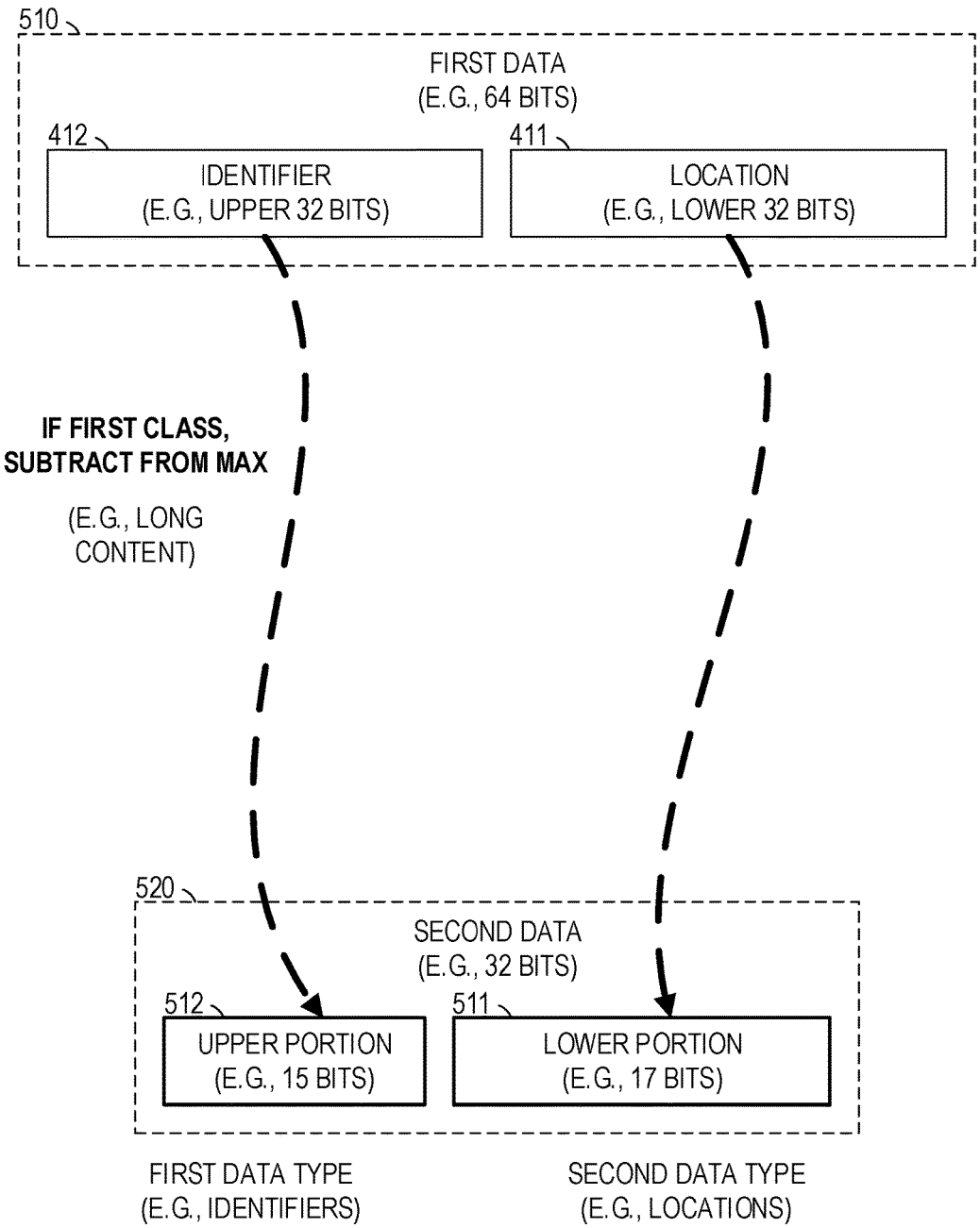
Figure 7:
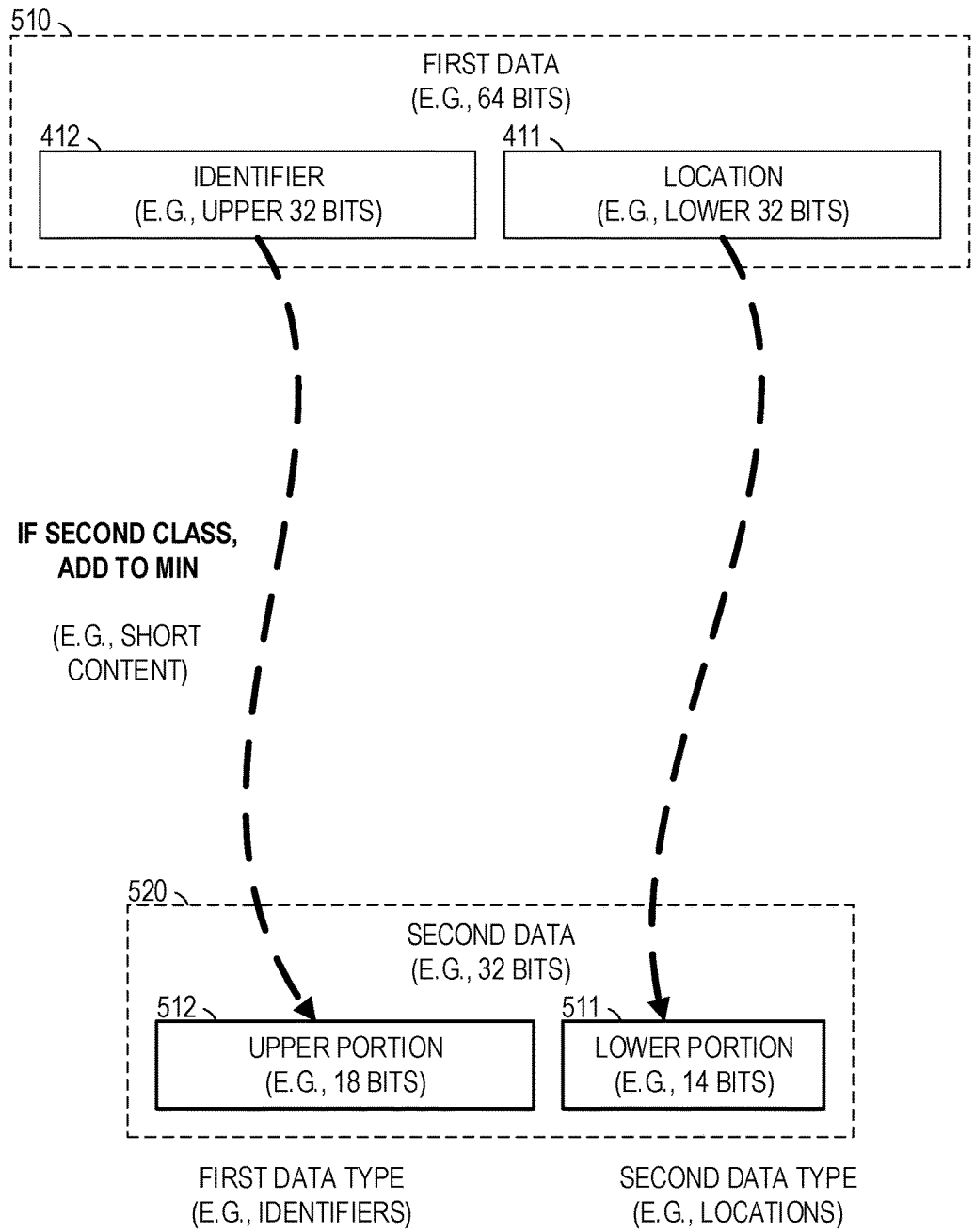
Figure 8:
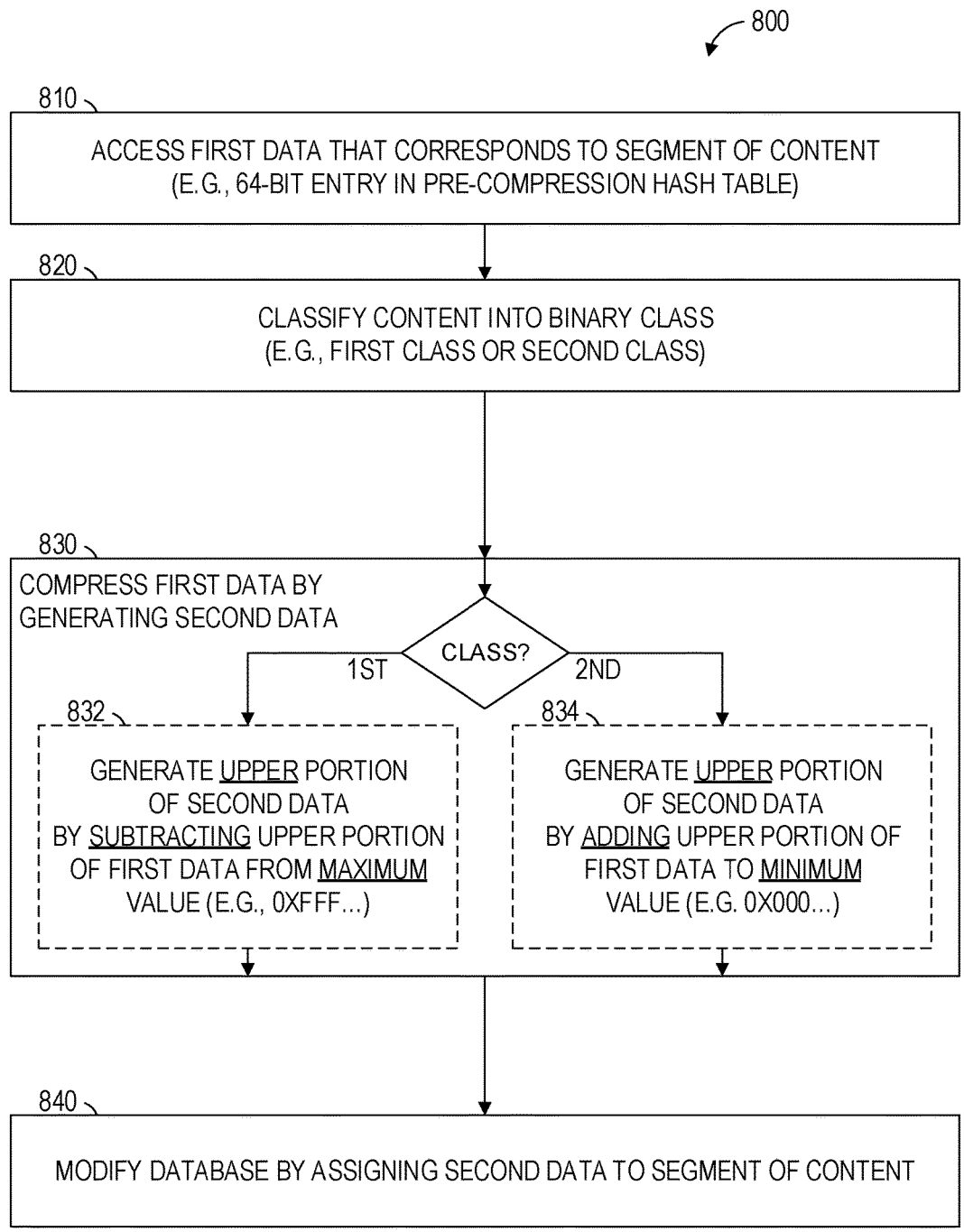
FIGS. 8-11 are flowcharts illustrating operations of the index management machine in performing a method of index compression, inter alia, according to some example embodiments.

FIGS. 5-7 are conceptual diagrams illustrating example relationships among information included in pre-compression first data 510 and in post-compression second data 520, according to some example embodiments. Starting with FIG. 5, the location 411 and the identifier 412 discussed above with respect to FIG. 4 may form all or part of the first data 510. In some situations, the first data 510 is or includes the entry 410 within the hash table 400. Accordingly, the first data 510 may be or include a 64-bit entry (e.g., entry 410) in a pre-compression hash table (e.g., hash table 400). According to some example embodiments, the identifier 412 within the first data 510 is a reference identifier (e.g., coded as REF ID) of the content 450 and may be represented by the upper 32 bits of the 64-bit entry (e.g., entry 410). According to certain example embodiments, the location 411 within the first data 510 is an offset (e.g., an offset position or offset location, coded as OFFSET) that references the segment 451 of the content 450 and may be represented by the lower 32 bits of the 64-bit entry (e.g., entry 410).

As shown in FIG. 5, the second data 520 can be generated based on the first data 510. In particular, this generation of the second data 520 may be performed on a portion-by-portion basis according to which an upper portion 512 of the second data 520 is generated based on the upper portion (e.g., identifier 412) of the first data 510, and a lower portion 511 of the second data 520 is generated based on the lower portion (e.g., location 411) of the first data 510. Accordingly, the generated upper portion 512 of the second data 520 may have the same data type (e.g., a first data type, such as identifiers) as the upper portion (e.g., identifier 412) of the first data 510. Similarly, the generated lower portion 511 of the second data may have the same data type (e.g., a second data type, such as locations) as the lower portion (e.g., location 411) of the first data 510.

The generated second data 520 generally occupies fewer bits (e.g., within computer memory) than the first data 510. As shown in FIG. 5, the first data 510 may occupy 64 bits, and the resulting second data 520 may occupy 32 bits. In the example embodiments illustrated in FIG. 5, the upper portion 512 and the lower portion 511 are the same size (e.g., 16 bits each), though this does not necessarily hold in other example embodiments.

In generating the upper portion 512 of the second data 520, the generation algorithm to be used is chosen (e.g., by the index management machine 110) based on the content 450. Specifically, the content 450 can be classified into one of two different available classes (e.g., binary classes), and the determined class of the content 450 is a basis for choosing the algorithm for generating the upper portion 512 of the second data 520. For example, the content 450 can be classified by its duration into either a short classification (e.g., for content with durations under a predetermined threshold duration, such as 150 seconds in length) or a long classification (e.g., for content with durations that meet or exceed the predetermined threshold duration, such as 150 seconds).

In example embodiments illustrated in FIG. 5, if the content 450 has the first class (e.g., long duration content), the upper portion 512 of the second data 520 is generated by subtracting the upper portion (e.g., identifier 412) of the first data 510 from a maximum value representable by the upper portion 512 of the second data 520 (e.g., the maximum value representable by the number of bits allocated to the upper portion 512 of the second data 520). In many situations, the maximum value is a string of hexadecimal fifteen (0xF) values. Otherwise, if the content 450 has a second class (e.g., short duration content), the upper portion 512 of the second data 520 is generated by adding the upper portion (e.g., identifier 412) of the first data 510 to a minimum value representable by the upper portion 512 of the second data 520 (e.g., the minimum value representable by the number of bits allocated to the upper portion 512 of the second data 520). In many situations, the minimum value is a string of hexadecimal zero (0x0) values.

FIG. 6 illustrates some example embodiments in which the content 450 is determined to have the first class (e.g., long duration content). Based on the determination that the content 450 has the first class, the upper portion 512 of the second data 520 may be allocated a predetermined size (e.g., a predetermined first size, such as 15 bits), which may occupy a fewer number of bits than an alternative predetermined size (e.g., a predetermined second size, which may be 18 bits) for situations in which the content 450 has the second class (e.g., short duration content).

As shown in FIG. 6, since the content 450 has the first class (e.g., long duration), the upper portion 512 of the second data 520 is generated by subtracting the upper portion (e.g., the upper 32 bits) of the first data 510 from the maximum value that can be represented by the upper portion 512 of the second data 520. For example, the upper 32 bits of the first data 510 may be subtracted from a string of hexadecimal fifteen (0xF) values that occupy all bits allocated to the upper portion 512 of the second data 520 (e.g., all 15 bits of the predetermined first size).

As also shown in FIG. 6, the lower portion 511 of the second data 520 may be allocated a predetermined size (e.g., a predetermined third size, such as 17 bits), which may occupy the remainder of the bits for the second data 520 (e.g., 17 bits among 32 bits allocated for the second data 520). The lower portion 511 of the second data 520 may be generated by copying a subset of the lower portion (e.g., the lower 32 bits) of the first data 510, quantizing this subset, executing a compression algorithm on this subset, or any suitable combination thereof. For example, this subset may be or include the most significant bits in the lower portion (e.g., location 411) of the first data 510.

FIG. 7 illustrates some example embodiments in which the content 450 is determined to have the second class (e.g., short duration content). Based on the determination that the content 450 has the second class, the upper portion 512 of the second data 520 may be allocated a predetermined size (e.g., the predetermined second size, such as 18 bits), which may occupy a larger number of bits than the alternative predetermined size (e.g., the predetermined first size, which may be 15 bits) for situations in which the content 450 has the first class (e.g., long duration content).

As shown in FIG. 7, since the content 450 has the second class (e.g., short duration), the upper portion 512 of the second data 520 is generated by adding the upper portion (e.g., the upper 32 bits) of the first data 510 to the minimum value (e.g., zero) that can be represented by the upper portion 512 of the second data 520. For example, the upper 32 bits of the first data 510 may be added to a string of hexadecimal zero (0x0) values that occupy all bits allocated to the upper portion 512 of the second data 520 (e.g., all 18 bits of the predetermined second size).

As also shown in FIG. 7, the lower portion 511 of the second data 520 may be allocated a predetermined size (e.g., a predetermined third size, such as 14 bits), which may occupy the remainder of the bits for the second data 520 (e.g., 14 bits among 32 bits allocated for the second data 520). The lower portion 511 of the second data 520 may be generated by copying a subset of the lower portion (e.g., the lower 32 bits) of the first data 510, quantizing this subset, executing a compression algorithm on this subset, or any suitable combination thereof. For example, this subset may be or include the most significant bits in the lower portion (e.g., location 411) of the first data 510.

FIGS. 8-11 are flowcharts illustrating operations of the index management machine 110 in performing a method 800 of index compression, inter alia, according to some example embodiments. In particular, performance of the method 800 may result in full or partial compression of the hash table 400 by compressing the entry 410 within the hash table 400 to obtain the second data 520 discussed above with respect to FIGS. 5-7. Operations in the method 800 may be performed by the index management machine 110, using components (e.g., modules) described above with respect to FIG. 2, using one or more processors (e.g., microprocessors or other hardware processors), or using any suitable combination thereof. In some example embodiments, a device (e.g., device 130) is configured to perform all or part of the method 800 using such components. As illustrated, the method 800 includes operations 810, 820, 830, and 840.

In operation 810, the index accessor 210 accesses the first data 510 (e.g., expressed in a first number of bits, such as 64 bits). This may be performed by accessing the first data 510 from the database 115. As noted above, the first data 510 may be or include the entry 410 in the hash table 400 and thus may correspond to the segment 451 of the content 450.

In operation 820, the content classifier 220 classifies the content 450 into one of two binary classes. This may be performed by determining whether the content 450 is a member of a first class or otherwise a member of a second class. In some example embodiments, the first class is a category for long-duration content (e.g., content having durations that meet or exceed a predetermined threshold duration, such as 120 or 150 seconds), and the second class is a category for short-duration content (e.g., content having durations that fall below the predetermined threshold duration).

In operation 830, the index compressor 230 compresses the accessed first data 510 by generating the second data 520 (e.g., within the database 115 or within a memory of the index management machine 110). This may be performed in accordance with the above discussion with respect to FIGS. 5-7. In particular, within any individual instance of operation 830, the binary class of the content 450 determines whether operation 832 or operation 834 is performed as part of operation 830.

If the content 450 is determined to have the first binary class (e.g., long duration content), the index compressor 230 performs operation 832 by generating the upper portion 512 (e.g., first upper portion) of the second data 520 (e.g., expressed as a second number of bits, such as 32 bits). According to operation 832, the upper portion 512 is generated by subtracting the upper portion (e.g., identifier 412) of the first data 510 from a maximum value representable by the second data 520 (e.g., the highest value that can be expressed in the second number of bits). As noted above, where the content 450 has the first binary class, the upper portion 512 of the second data 520 may be generated such that it fits into a previously allocated size (e.g., first size, such as 16 bits or 15 bits). Furthermore, this previously allocated size may correspond to the data type (e.g., first data type, such as identifiers) for the upper portion (e.g., identifier 412) of the first data 510, for the upper portion 512 of the second data 520, or both.

Otherwise, if the content 450 is determined to have the second binary class (e.g., short duration content), the index compressor 230 performs operation 834 by generating the upper portion 512 (e.g., second upper portion) of the second data 520 (e.g., expressed in the second number of bits, such as 32 bits). According to operation 834, the upper portion 512 is generated by adding the upper portion (e.g., identifier 412) of the first data 510 to a minimum value representable by the second data 520 (e.g., the lowest value that can be expressed in the second number of bits). As noted above, where the content 450 has a second binary class, the upper portion 512 of the second data 520 may be generated such that it fits into a previously allocated size (e.g., second size, such as 16 bits or 18 bits). Furthermore, this previously allocated size may correspond to the data type (e.g., first data type, such as identifiers) for the upper portion (e.g., identifier 412) of the first data 510, for the upper portion 512 of the second data 520, or both.

As discussed in greater detail below, operation 830 further includes generation of the lower portion 511 of the second data 520 (e.g., by the index compressor 230). The lower portion 511 of the second data 520 may be generated such that it fits into a previously allocated size (e.g., third size, such as 16 bits, 17 bits, or 14 bits). Furthermore, this previously allocated size may correspond to the data type (e.g., second data type, such as locations) for the lower portion (e.g., location 411) of the first data 510, for the lower portion 511 of the second data 520, or both. Accordingly, with both the upper portion 512 of the second data 520 and the lower portion 511 of the second data 520 being generated, the entirety of the second data 520 may likewise be considered as generated.

In operation 840, the index modifier 240 modifies the database 115 by assigning the now-generated second data 520 to the segment 451 of the content 450. This may include fully or partially modifying the entry 410 within the hash table 400 (e.g., from a pre-compression states to a post-compression state). Alternatively, this may include generating a post-compression version of the entry 410, a post-compression version of the hash table 400, or both, within the database 115.

Figure 9:
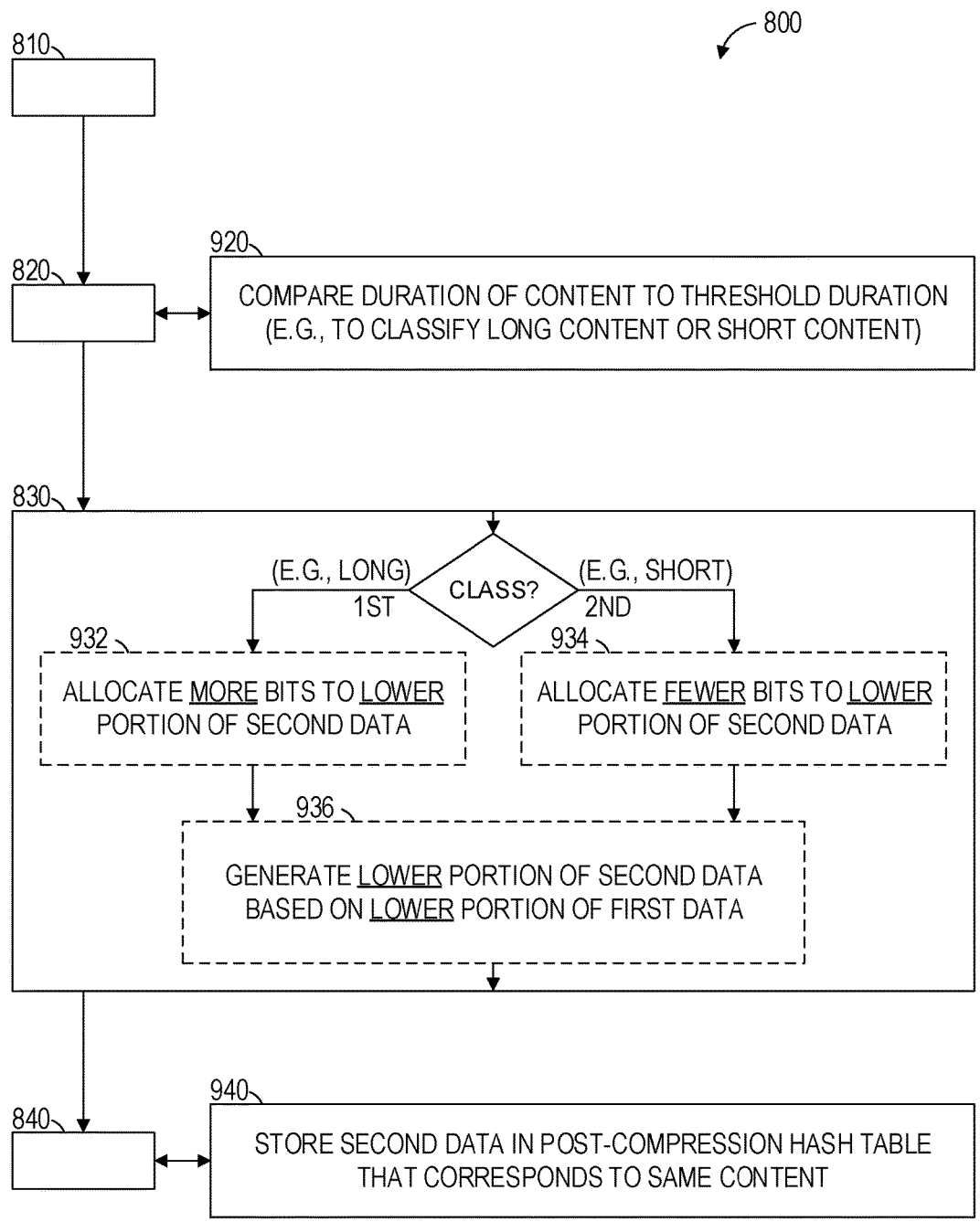

As shown in FIG. 9, in addition to any one or more of the operations previously described for the method 800, the method 800 may include one or more of operations 920, 932, 934, 936, and 940. Operation 920 may be performed as part (e.g., a precursor task, a subroutine, or a portion) of operation 820, in which the content 450 is classified into one of two binary classes. In operation 920, the classification of the content 450 includes comparing the duration of the content 450 to a predetermined threshold duration (e.g., 120 or 150 seconds). Based on this comparison of durations, performance of operation 820 results in classifying the content 450 as either long-duration content or short-duration content.

As also shown in FIG. 9, within any individual instance of operation 830, the binary class of the content 450 may determine whether operation 932 or operation 934 is performed as part of operation 830. For example, if the content 450 has the first binary class (e.g., long duration), the index compressor 230 performs operation 932 by allocating more bits (e.g., 17 bits, which may provide more bits for representing more locations within longer songs or videos) to the lower portion 511 of the second data 520. Otherwise, if the content 450 has the second binary class (e.g., short duration), the index compressor 230 performs operation 934 by allocating fewer bits (e.g., 14 bits, which may provide fewer bits for representing fewer locations with shorter songs or videos) to the lower portion 511 of the second data 520.

Having allocated an appropriate number of bits to the lower portion 511 of the second data 520, the index compressor 230 may perform operation 936 as part of operation 830 by generating the lower portion 511 of the second data 520 based on the lower portion (e.g., location 411) of the first data 510. This may be performed as described above with respect to FIGS. 5-7.

As further shown in FIG. 9, operation 940 may be performed as part of operation 840, in which the index modifier 240 assigns the second data 520 to the second 451 of the content 450. In operation 940, the index modifier 240 stores the now-generated second data 520 in a post-compression hash table that corresponds to the same content 450 as the hash table 400 (e.g., a pre-compression hash table for the same content 450). In some situations, a pre-compression hash table (e.g., hash table 400) is modified to become the post-compression hash table. In other situations, the post-compression hash table is a separate data structure within the database 115.

Figure 10:
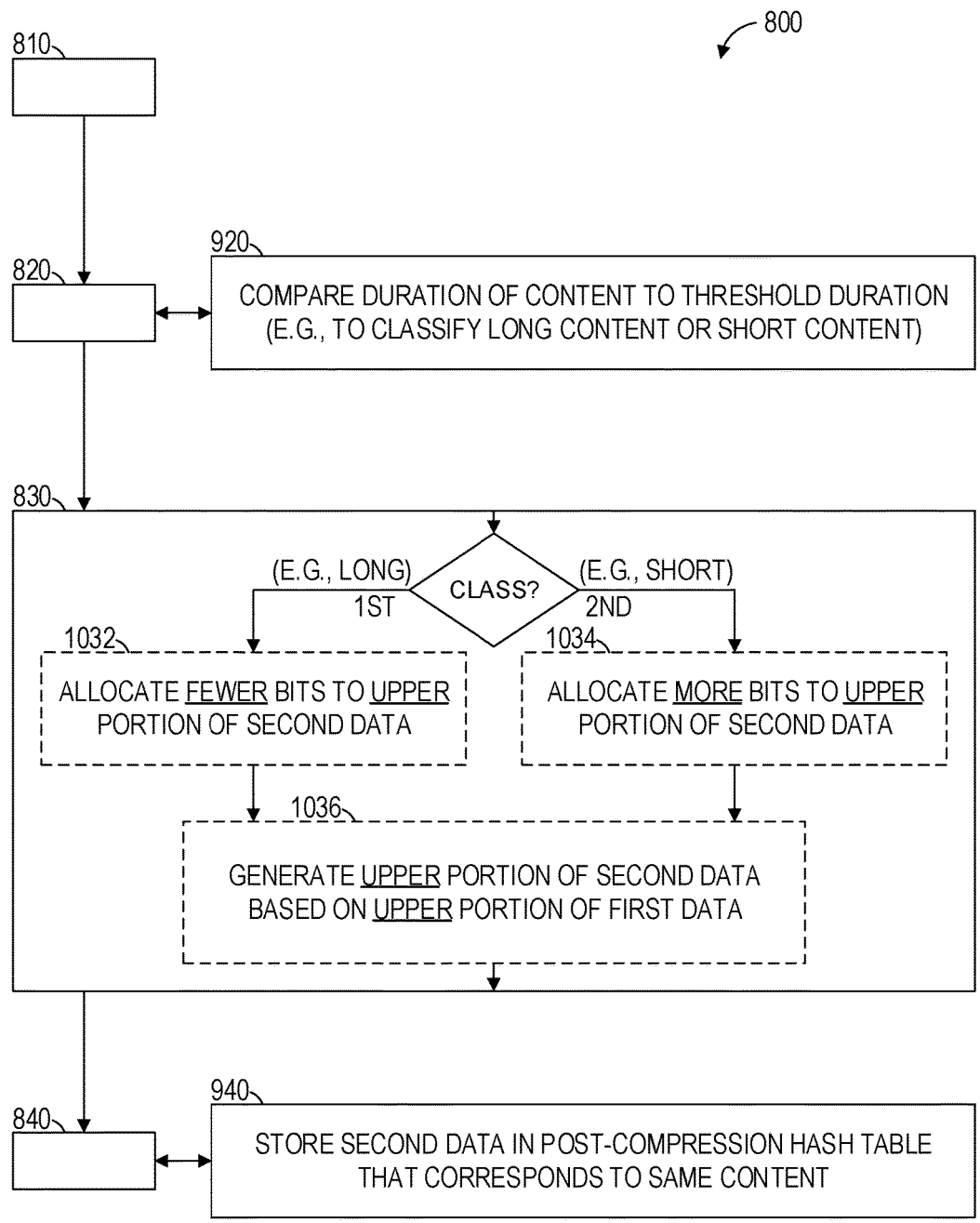

As shown in FIG. 10, in addition to any one or more of the operations previously described for the method 800, the method 800 may include one or more of operations 1032, 1034, and 1036. Operations 920 and 940 continue to be shown for purposes of clarity. As illustrated in FIG. 10, within any individual instance of operation 830, the binary class of the content 450 may determine whether operation 1032 or 1034 is performed as part of operation 830. For example, if the content 450 has the first binary class (e.g., long duration), the index compressor 230 performs operation 1032 by allocating fewer bits (e.g., 15 bits) to the upper portion 512 of the second data 520. This may enable allocation of more bits for representing more locations within longer songs or videos (e.g., in operation 932). Otherwise, if the content 450 has the second binary class (e.g., short duration), the index compressor 230 performs operation 1034 or by allocating more bits (e.g., 18 bits) to the upper portion 512 of the second data 520. This may enable allocation of fewer bits for representing fewer locations with shorter songs or videos (e.g., in operation 934).

Having allocated an appropriate number of bits to the upper portion 512 of the second data 520, the index compressor 230 may perform operation 1036 as part of operation 830 by generating the upper portion 512 of the second data 520 based on the upper portion (e.g., identifier 412) of the first data 510. This may be performed as described above with respect to FIGS. 5-7.

Figure 11:
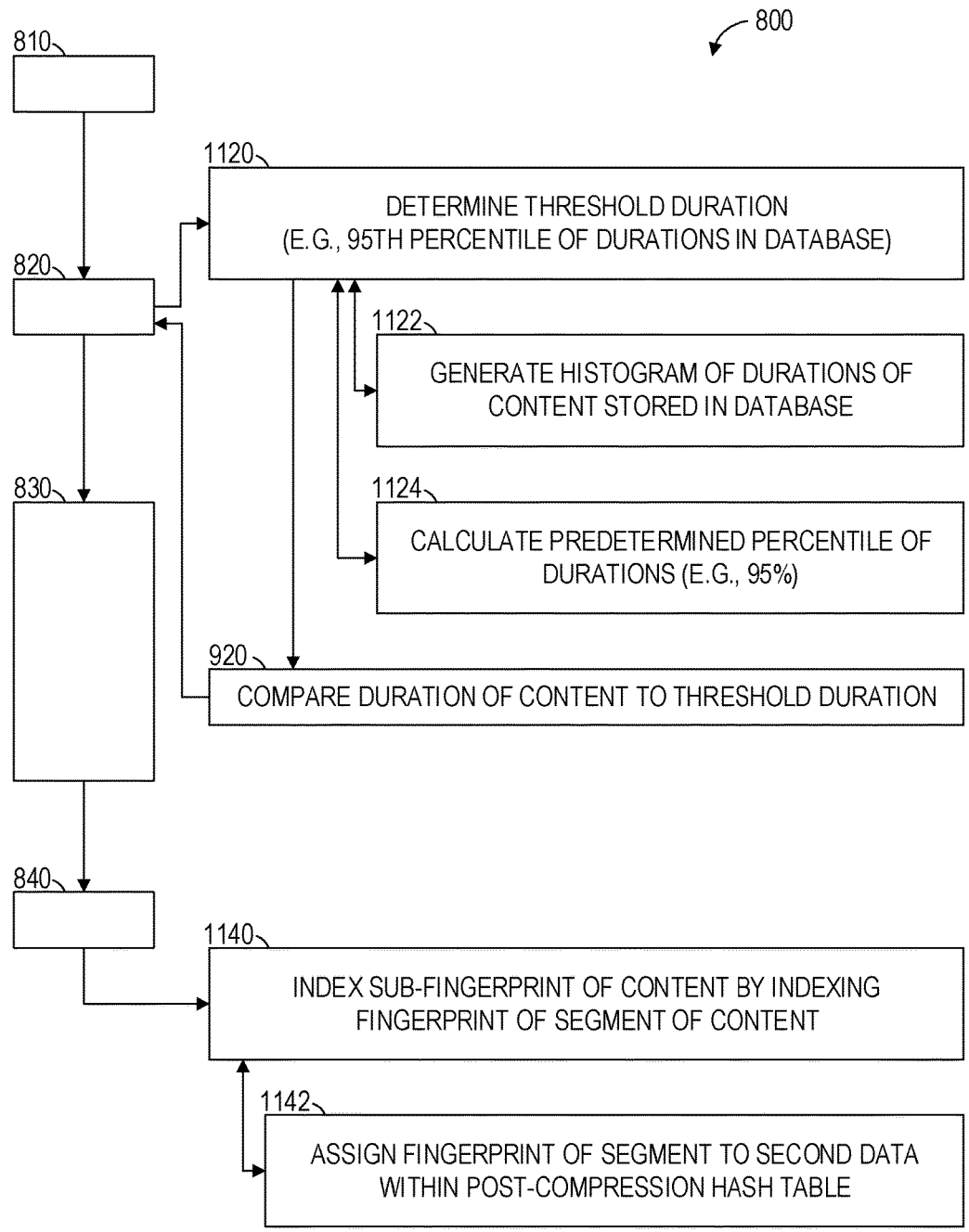

As shown in FIG. 11, in addition to any one or more of the operations previously described the method 800, the method 800 may include one or more of operations 1120, 1122, 1124, 1140, and 1142. Operation 920 continues to be shown for purposes of clarity. As illustrated in FIG. 11, one or more of operations 1120, 1122, and 1124 may be performed as part of operation 820, and may be performed prior to operation 920. In operation 1120, the content classifier 220 determines the threshold duration to be used in operation 920. This may be done by performing one or more of operations 1122 and 1124, each of which may be performed as part of operation 1120. In operation 1122, the content classifier 220 generates a histogram of durations of content (e.g., multiple pieces of media content that includes the content 450). Such content may be stored in the database 115 (e.g., as a library of content). In operation 1124, the content classifier 220 calculates or otherwise obtains a duration that corresponds to a predetermined percentile (e.g., 95th percentile) of the durations of content, and this calculation may be based on the histogram generated in operation 1122.

Accordingly, the duration that corresponds to the predetermined percentile they represent the predetermined percentile of the durations indicated by the histogram. For example, if the predetermined percentile is 95%, the first binary class (e.g., long duration content) may indicate content with durations that meet or exceed 95% of the durations represented by the histogram, and the second binary class (e.g., short duration content) may indicate content with durations that fail to exceed 95% of the durations represented by the histogram.

Operation 1140 may be performed at any point after operation 830. FIG. 11 illustrates operation 1140 being performed after operation 840, in which the index modifier 240 assigns the second data 520 to the segment 451 of the content 450. In operation 1140, the index modifier 240 indexes a sub-fingerprint of the content 450 by indexing the data 461 (e.g., a fingerprint) that corresponds to the segment 451 of the content 450. For example, operation 1142 may be performed as part of operation 1140. In operation 1142, the index modifier 240 performs indexing of the sub-fingerprint by linking, mapping, or otherwise assigning the data 461 (e.g., the fingerprint of the segment 451) to the second data 520. In some example embodiments, the assigning of the data 461 occurs within a post-compression hash table (e.g., a post-compression version of the hash table 400) for the content 450 within the database 115.

Figure 12:
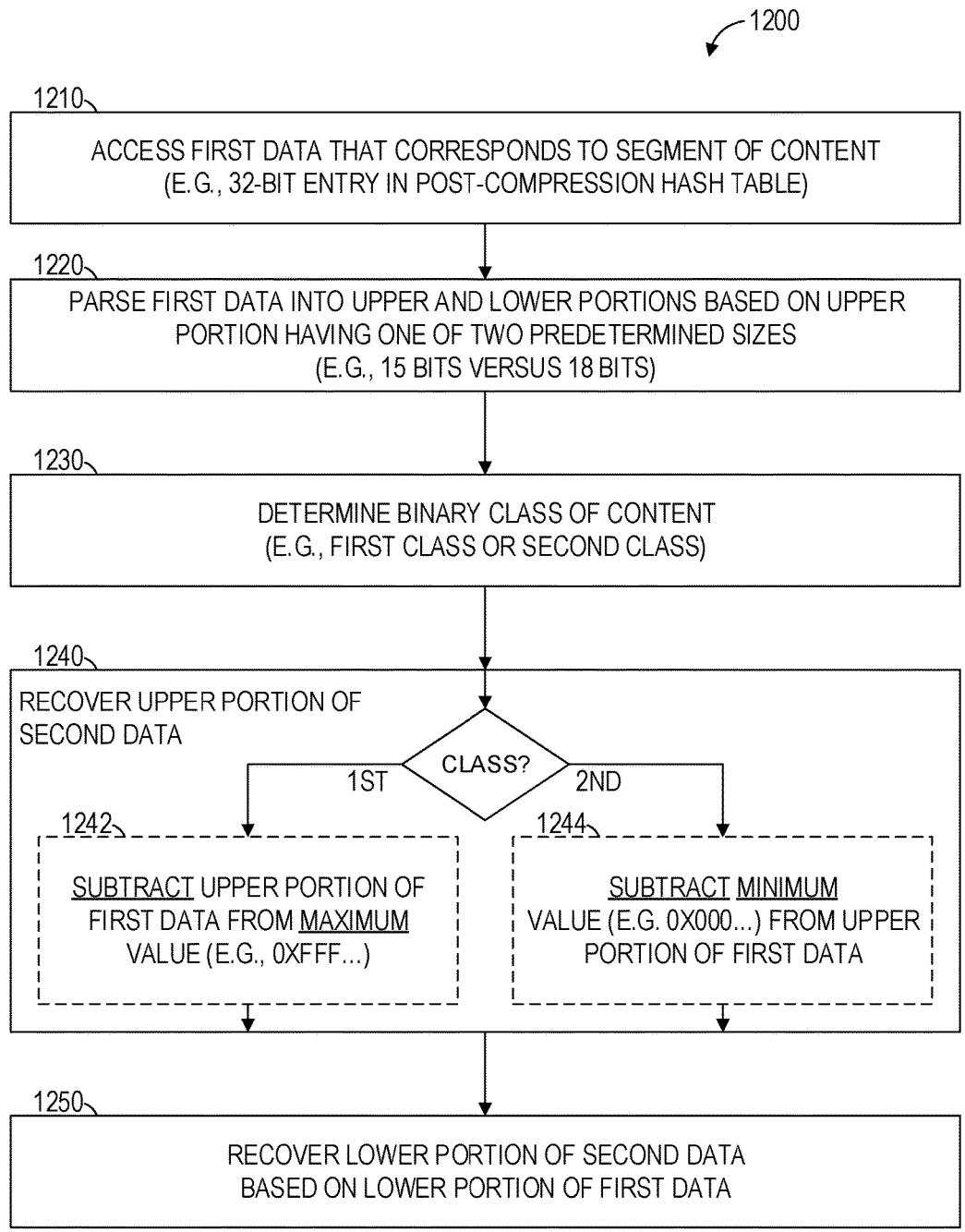
FIGS. 12 and 13 are flowcharts illustrating operations of the index management machine in performing a method of index decompression, inter alia, according to some example embodiments.
Figure 13:
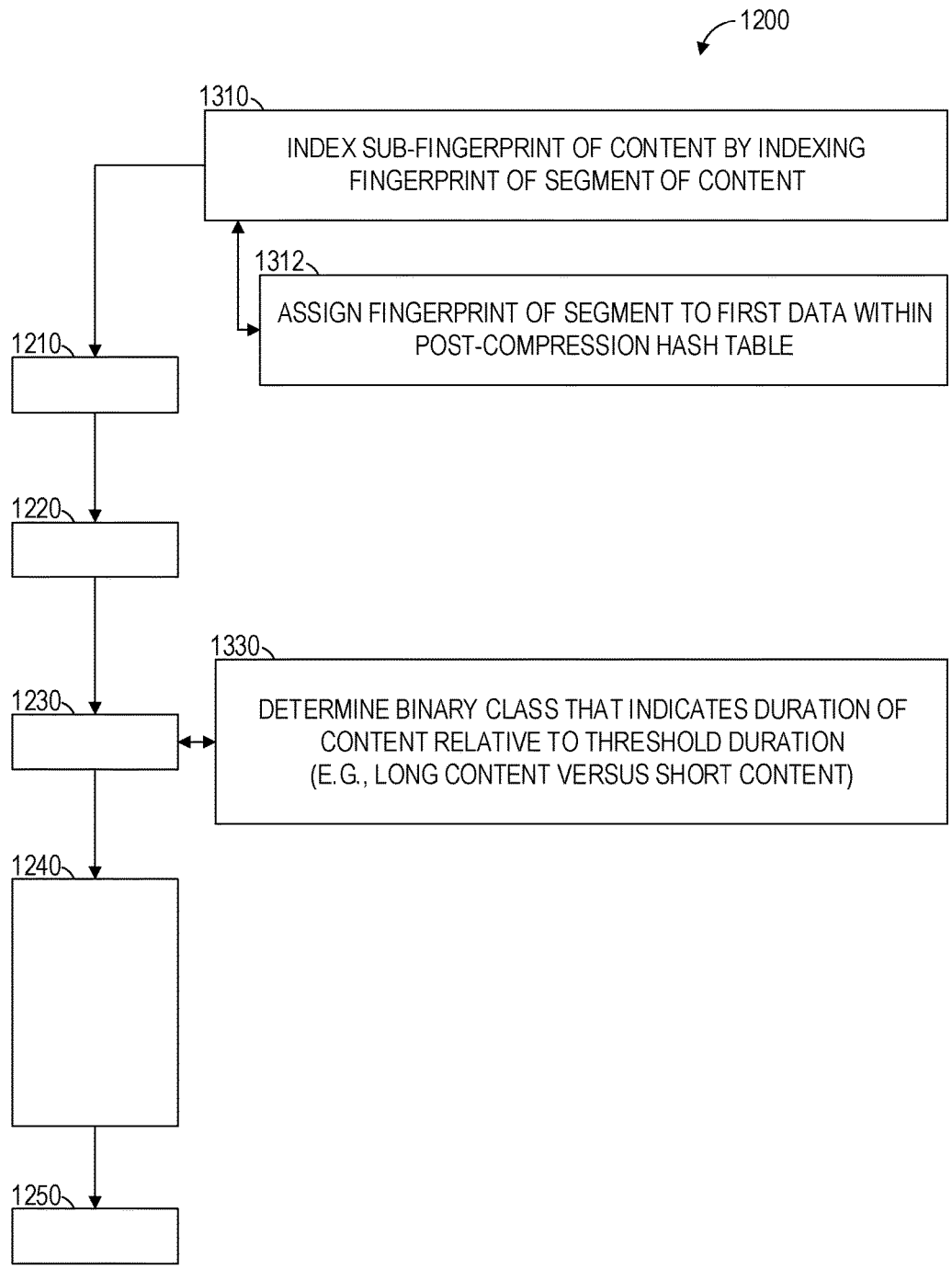

FIGS. 12 and 13 are flowcharts illustrating operations of the index management machine 110 in performing a method 1200 of index decompression, inter alia, according to some example embodiments. In particular, performance of the method 1200 may result in full or partial recovery of the hash table 400 by recovering the entry 410 within the hash table 400 based on the second data 520 discussed above with respect to FIGS. 5-7. Operations in the method 1200 may be performed by the index management machine 110, using components (e.g., modules) described above with respect to FIG. 3, using one or more processors (e.g., microprocessors or other hardware processors), or using any suitable combination thereof. In some example embodiments, a device (e.g., device 130) is configured to perform all or part of the method 1200 using such components. As illustrated, the method 1200 includes operations 1210, 1220, 1230, 1240, and 1250.

In operation 1210, the index accessor 210 accesses pre-decompression first data (e.g., denoted above as second data 520 with respect to the method 800). This pre-decompression (e.g., post-compression) first data corresponds to the segment 451 of the content 450 and may be or include a 32-bit entry in a post-compression hash table (e.g., a post-compression version of the hash table 400) within the database 115.

In operation 1220, the index parser 320 parses the accessed first data into an upper portion (e.g., upper portion 512) and a lower portion (e.g., lower portion 511). This may be performed by recognizing that the upper portion occupies a predetermined size in memory (e.g., one of two possible predetermined sizes for the upper portion, such as either 15 bits or 18 bits). In some example embodiments, this is performed by recognizing that the lower portion occupies a predetermined size in memory (e.g., one of two possible predetermined sizes for the lower portion, such as either 17 bits or 14 bits).

In operation 1230, the index decompressor 330 determines the binary class of the content 450. This may be performed by assigning the content 450 to either a first binary class (e.g., long duration content) or a second binary class (e.g., short duration content). Moreover, the selection of which binary class is appropriate for the content 450 may be based on the size (e.g., one of two possible predetermined sizes) of the upper portion (e.g., upper portion 512) parsed from the first data accessed in operation 1210.

In operation 1240, the index decompressor 330 recovers the upper portion (e.g., identifier 412) of post-decompression second data (e.g., denoted above as first data 510 with respect the method 800). This may be performed in accordance with the above discussion with respect to FIGS. 5-7 (e.g., by reversing the compression methodology). In particular, within any individual instance of operation 1240, the binary class of the content 450 determines whether operation 1242 or operation 1244 is performed as part of operation 1240.

If the content 450 is determined to have the first binary class (e.g., long duration content), the index decompressor 330 performs operation 1242 to recover the identifier 412 of the content 450. According to operation 1242, the identifier 412 is recovered by subtracting the upper portion (e.g., upper portion 512) parsed in operation 1220 from a maximum value representable by the number of bits occupied by the first data (e.g., the highest value that can be expressed by the number of bits used to represent the first data).

Otherwise, if the content 450 is determined to have the second binary class (e.g., short duration content), the index decompressor 330 performs operation 1244 to recover the identifier 412 of the content 450. According to operation 1244, the identifier 412 is recovered by subtracting a minimum value representable by the number of bits occupied by the first data (e.g., the lowest value that can be expressed by the number of bits used to represent the first data).

In operation 1250, the index decompressor 330 recovers the lower portion (e.g., location 411) of the post-decompression second data. This lower portion may be generated based on the lower portion (e.g., lower portion 511) parsed from the first data accessed in operation 1210. Accordingly, with both the upper portion (e.g., identifier 412) of the post-decompression second data and the lower portion (e.g., location 411) of the post-decompression second data being generated, the entirety of the post-decompression second data (e.g., equivalent in value to the pre-compression entry 410 in the pre-compression hash table 400) may likewise be considered as generated.

As shown in FIG. 13, in addition to any one or more of the operations previously described the method 1200, the method 1200 may include one or more of operations 1310, 1312, and 1330. Operation 1310 may be performed at any point prior to operation 1210. Functionally, operation 1310 is similar to operation 1440 described above with respect to FIG. 11. In the context of the method 1200, according to example embodiments that include operation 1310, the index modifier 240 is present and performs operation 1310 by indexing a sub-fingerprint of the content 450. As noted above, this can be done by indexing the data 461 (e.g., a fingerprint) that corresponds to the second 451 of the content 450. As shown in FIG. 13 by operation 1312, which may be performed as part of operation 1310, the index modifier 240 can perform the indexing of the sub-fingerprint by linking, mapping, or otherwise assigning the data 461 (e.g., the fingerprint of the segment 451) to the pre-decompression first data accessed in operation 1210. In some example embodiments, the assigning of the data 461 occurs within a pre-decompression hash table (e.g., a post-compression version of the hash table 400) for the content 450 within the database 115.

As also shown in FIG. 13, operation 1330 may be performed as part of operation 1230, in which the index decompressor 330 determines the binary class of the content 450 (e.g., a first binary class for long duration content or a second binary class for short duration content). In operation 1330, the index decompressor 330 determines the binary class of the content 450, and the binary class indicates the duration of the content 450 relative to a threshold duration (e.g., a predetermined threshold duration, as may be determined in accordance with operation 1120).

According to various example embodiments, one or more of the methodologies described herein may facilitate full or partial compression of an entry within a hash table (e.g., entry 410 in hash table 400), full or partial decompression of the entry within the hash table, full or partial compression of the hash table itself, full or partial decompression of the hash table, or any suitable combination thereof. Moreover, one or more of the methodologies described herein may facilitate efficiencies or other improvements in storage, indexing, reindexing, search, retrieval, comparison, or matching of data (e.g., fingerprints of segments of media content). Hence, one or more of the methodologies described herein may facilitate efficiencies or other improvements in identifying data (e.g., fingerprints of segments of media content), as well as efficiencies or other improvements in search engines that identify such data, compared to capabilities of pre-existing systems and methods.

When these effects are considered in aggregate, one or more of the methodologies described herein may obviate a need for certain efforts or resources that otherwise would be involved in data management, data indexing, data retrieval, or any suitable combination thereof. Efforts expended by a user in performing these operations may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 14:
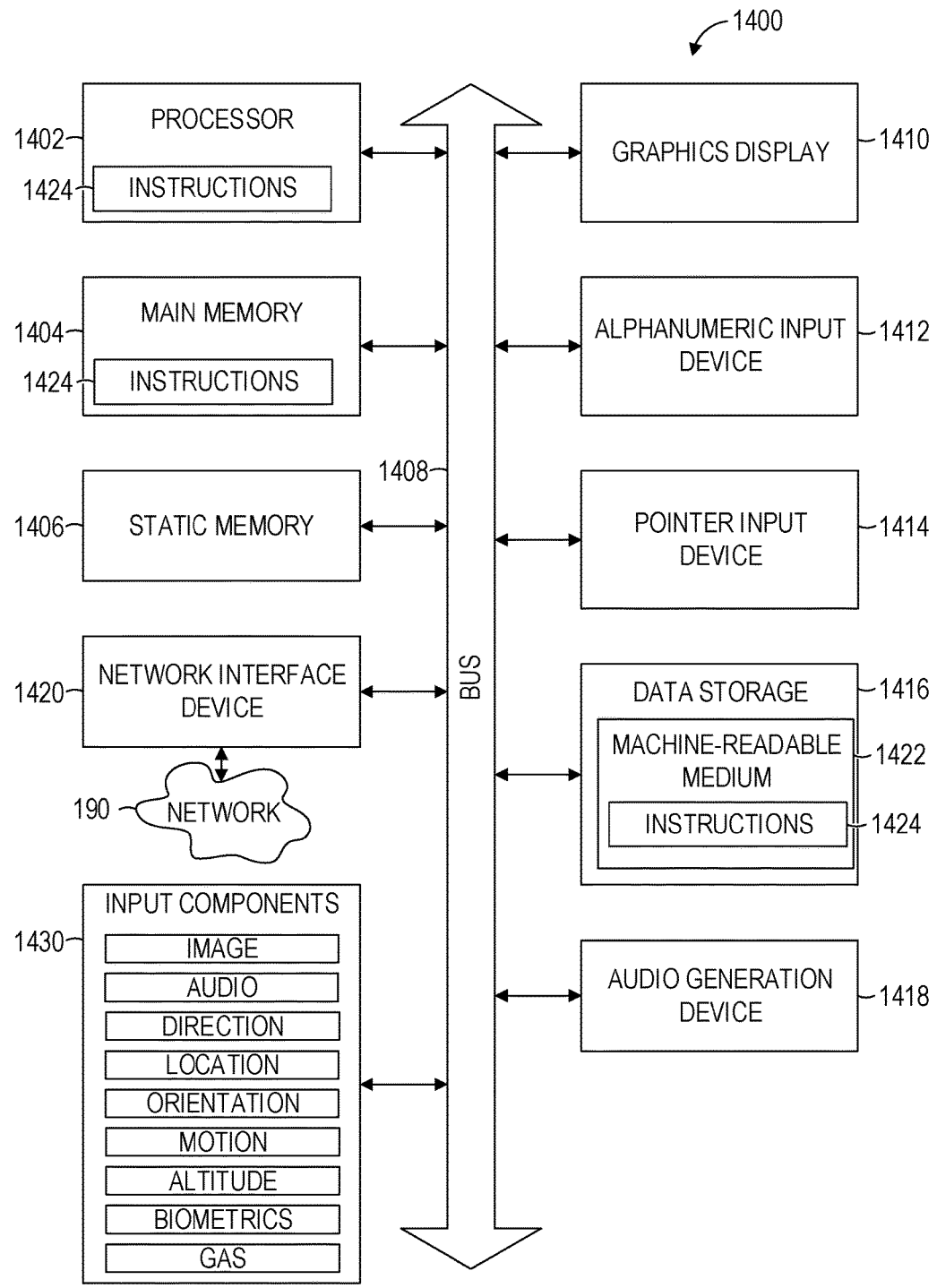
FIG. 14 is a block diagram illustrating components of a machine, according to some example embodiments, able to read instructions from a machine-readable medium and perform any one or more of the methodologies discussed herein.

FIG. 14 is a block diagram illustrating components of a machine 1400, according to some example embodiments, able to read instructions 1424 from a machine-readable medium 1422 (e.g., a non-transitory machine-readable medium, a machine-readable storage medium, a computer-readable storage medium, or any suitable combination thereof) and perform any one or more of the methodologies discussed herein, in whole or in part. Specifically, FIG. 14 shows the machine 1400 in the example form of a computer system (e.g., a computer) within which the instructions 1424 (e.g., software, a program, an application, an applet, an app, or other executable code) for causing the machine 1400 to perform any one or more of the methodologies discussed herein may be executed, in whole or in part.

In alternative embodiments, the machine 1400 operates as a standalone device or may be communicatively coupled (e.g., networked) to other machines. In a networked deployment, the machine 1400 may operate in the capacity of a server machine or a client machine in a server-client network environment, or as a peer machine in a distributed (e.g., peer-to-peer) network environment. The machine 1400 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1424, sequentially or otherwise, that specify actions to be taken by that machine. Further, while only a single machine is illustrated, the term "machine" shall also be taken to include any collection of machines that individually or jointly execute the instructions 1424 to perform all or part of any one or more of the methodologies discussed herein.

The machine 1400 includes a processor 1402 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1404, and a static memory 1406, which are configured to communicate with each other via a bus 1408. The processor 1402 contains solid-state digital microcircuits (e.g., electronic, optical, or both) that are configurable, temporarily or permanently, by some or all of the instructions 1424 such that the processor 1402 is configurable to perform any one or more of the methodologies described herein, in whole or in part. For example, a set of one or more microcircuits of the processor 1402 may be configurable to execute one or more modules (e.g., software modules) described herein. In some example embodiments, the processor 1402 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1400 with at least the processor 1402, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1400 may further include a graphics display 1410 (e.g., a plasma display panel (PDP), a light emitting diode (LED) display, a liquid crystal display (LCD), a projector, a cathode ray tube (CRT), or any other display capable of displaying graphics or video). The machine 1400 may also include an alphanumeric input device 1412 (e.g., a keyboard or keypad), a pointer input device 1414 (e.g., a mouse, a touchpad, a touchscreen, a trackball, a joystick, a stylus, a motion sensor, an eye tracking device, a data glove, or other pointing instrument), a data storage 1416, an audio generation device 1418 (e.g., a sound card, an amplifier, a speaker, a headphone jack, or any suitable combination thereof), and a network interface device 1420.

The data storage 1416 (e.g., a data storage device) includes the machine-readable medium 1422 (e.g., a tangible and non-transitory machine-readable storage medium) on which are stored the instructions 1424 embodying any one or more of the methodologies or functions described herein. The instructions 1424 may also reside, completely or at least partially, within the main memory 1404, within the static memory 1406, within the processor 1402 (e.g., within the processor's cache memory), or any suitable combination thereof, before or during execution thereof by the machine 1400. Accordingly, the main memory 1404, the static memory 1406, and the processor 1402 may be considered machine-readable media (e.g., tangible and non-transitory machine-readable media). The instructions 1424 may be transmitted or received over the network 190 via the network interface device 1420. For example, the network interface device 1420 may communicate the instructions 1424 using any one or more transfer protocols (e.g., hypertext transfer protocol (HTTP)).

In some example embodiments, the machine 1400 may be a portable computing device (e.g., a smart phone, a tablet computer, or a wearable device), and may have one or more additional input components 1430 (e.g., sensors or gauges). Examples of such input components 1430 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1422 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1424 for execution by the machine 1400, such that the instructions 1424, when executed by one or more processors of the machine 1400 (e.g., processor 1402), cause the machine 1400 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1424 for execution by the machine 1400 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1424).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., machines, devices, or other apparatus) discussed herein.

A first embodiment provides a method comprising:
accessing, by one or more processors, first data that corresponds to a segment of media content and is expressed in a first number of bits, an upper portion of the first number of bits having a first data type, a lower portion of the first number of bits having a second data type;
classifying, by the one or more processors, the media content into a binary class among a first binary class and a second binary class;
compressing, by the one or more processors, the first data by generating second data expressed in a second number of bits that are fewer than the first number of bits, the generating of the second data including:
if the media content has the first binary class, generating a first upper portion of the second number of bits by subtracting the upper portion of the first number of bits from a maximum value representable by the second number of bits, the first upper portion having a predetermined first size;
otherwise, if the media content has the second binary class, generating a second upper portion of the second number of bits by adding the upper portion of the first number of bits to a minimum value representable by the second number of bits, the second upper portion having a predetermined second size; and
assigning, by the one or more processors, the generated second data expressed in the second number of bits to the segment of the media content, the first or second upper portion of the second number of bits having the first data type, a lower portion of the second number of bits having the second data type and having a predetermined third size.

A second embodiment provides a method according to the first embodiment, wherein:
the first data identifies the segment of the media content;
the upper portion of the first number of bits encodes a media identifier that identifies the media content; and
the lower portion of the first number of bits encodes a location identifier that identifies a location of the segment within the media content.

A third embodiment provides a method according to the first embodiment or the second embodiment, wherein:
the predetermined first size of the first upper portion, the predetermined second size of the second upper portion, and the predetermined third size of the lower portion are equal;
the upper portion of the first number of bits is an upper half of the first number of bits and expresses a first numerical value that corresponds to the first data type; and
the lower portion of the first number of bits is a lower half of the first number of bits and expresses a second numerical value that corresponds to the second data type.

A fourth embodiment provides a method according to any of the first through third embodiments, wherein:
the first data is a 64-bit entry within a pre-compression hash table;
the upper portion of the first number of bits is a first 32-bit number that identifies the media content;
the lower portion of the first number of bits is a second 32-bit number that identifies a location of the segment within the media content; and
the assigning of the generated second data to the segment of the media content includes storing the second data in a post-compression hash table.

A fifth embodiment provides a method according to the fourth embodiment, wherein:
the first or second upper portion of the second number of bits identifies the media content;
the lower portion of the second number of bits identifies the segment of the media content; and
the second data is a 32-bit entry within the post-compression hash table.

A sixth embodiment provides a method according to any of the first through fifth embodiments, wherein:
the first predetermined size of the first upper portion of the second number of bits is larger than the second predetermined size of the second upper portion of the second number of bits; and
the compressing of the first data further includes:
if the media content has the first binary class, generating a first lower portion of the second number of bits based on the lower portion of the first number of bits;
otherwise, if the media content has the second binary class, generating a second lower portion of the second number of bits based on the lower portion of the first number of bits;
wherein the first lower portion of the second number of bits has more bits than the second lower portion of the second number of bits.

A seventh embodiment provides a method according to any of the first through sixth embodiments, wherein:
the classifying of the media content includes comparing a duration of the media content to a threshold duration, the first binary class indicating that the duration of the media content meets or exceeds the threshold duration, the second binary class indicating that the duration of the media content fails to exceed the threshold duration.

An eighth embodiment provides a method according to the seventh embodiment, wherein:
the first predetermined size of the first upper portion of the second number of bits is larger than the second predetermined size of the second upper portion of the second number of bits; and
the compressing of the first data further includes:
if the duration of the media content meets or exceeds the threshold duration, generating the first upper portion of the second number of bits based on the upper portion of the first number of bits;
otherwise, if the duration of the media content fails to exceed the threshold duration, generating the second upper portion of the second number of bits based on the upper portion of the first number of bits; wherein
the first upper portion of the second number of bits has fewer bits than the second upper portion of the second number bits.

A ninth embodiment provides a method according to the seventh embodiment or the eighth embodiment, wherein:
the compressing of the first data further includes:
if the duration of the media content meets or exceeds the threshold duration, generating a first lower portion of the second number of bits based on the lower portion of the first number of bits;
otherwise, if the duration of the media content fails to exceed the threshold duration, generating a second lower portion of the second number of bits based on the lower portion of the first number of bits; wherein
the first lower portion of the second number of bits has more bits than the second lower portion of the second number of bits.

A tenth embodiment provides a method according to any of the seventh through ninth embodiments, further comprising:
determining the threshold duration prior to the classifying of the media content, the determining of the threshold duration including:
generating a histogram of durations of media content stored in a database of media content; and
calculating a predetermined percentile of the durations of media content from the generated histogram, the determined threshold duration representing the predetermined percentile of the durations.

An eleventh embodiment provides a method according to the tenth embodiment, wherein:
the predetermined percentile is 95%;
the first binary class indicates that the duration of the media content meets or exceeds at least 95% of the durations represented by the histogram; and
the second binary class indicates that the duration of the media content fails to exceed 95% of the durations represented by the histogram.

A twelfth embodiment provides a method according to any of the first through eleventh embodiments, wherein:
the second data is a 32-bit number within which the first upper portion of the second number of bits is an 18-bit number that identifies the media content and within which the second upper portion of the second number of bits is a 15-bit number that identifies the media content.

A thirteenth embodiment provides a method according to any of the first through eleventh embodiments, wherein:
the compressing of the first data further includes:
if the media content has the first binary class, generating a first lower portion of the second number of bits based on the lower portion of the first number of bits;
otherwise, if the media content has the second binary class, generating a second lower portion of the second number of bits based on the lower portion of the first number of bits; and
the second data is a 32-bit number within which the first lower portion of the second number of bits is a 14-bit number that identifies a location of the segment within the media content and within which the second lower portion of the second number of bits is a 17-bit number that identifies the location of the segment within the media content.

A fourteenth embodiment provides a method according to any of the first through thirteenth embodiments, further comprising:
indexing a sub-fingerprint of the media content by indexing a fingerprint of the segment of the media content, the indexing of the fingerprint of the segment including assigning the fingerprint of the segment to the generated second data within a hash table that correlates the generated second data to the segment of the media content.

A fifteenth embodiment provides a method according to any of the first through fourteenth embodiments, wherein:
the minimum value representable by the second number of bits is a string of hexadecimal zero (0x0) values; and
the maximum value representable by the second number of bits is a string of hexadecimal fifteen (0xF) values.

A sixteenth embodiment provides a machine-readable medium (e.g., transitory or non-transitory machine-readable medium, such as a non-transitory machine-readable storage medium) comprising instructions that, when executed by one or more processors of a machine, cause the machine to perform operations comprising:
accessing first data that corresponds to a segment of media content and is expressed in a first number of bits, an upper portion of the first number of bits having a first data type, a lower portion of the first number of bits having a second data type;
classifying the media content into a binary class among a first binary class and a second binary class;
compressing the first data by generating second data expressed in a second number of bits that are fewer than the first number of bits, the generating of the second data including:
if the media content has the first binary class, generating a first upper portion of the second number of bits by subtracting the upper portion of the first number of bits from a maximum value representable by the second number of bits, the first upper portion having a predetermined first size;
otherwise, if the media content has the second binary class, generating a second upper portion of the second number of bits by adding the upper portion of the first number of bits to a minimum value representable by the second number of bits, the second upper portion having a predetermined second size; and
assigning the generated second data expressed in the second number of bits to the segment of the media content, the first or second upper portion of the second number of bits having the first data type, a lower portion of the second number of bits having the second data type and having a predetermined third size.

A seventeenth embodiment provides a machine-readable medium according to the sixteenth embodiment, wherein:
the first predetermined size of the first upper portion of the second number of bits is larger than the second predetermined size of the second upper portion of the second number of bits; and
the compressing of the first data further includes:
if the media content has the first binary class, generating a first lower portion of the second number of bits based on the lower portion of the first number of bits;
otherwise, if the media content has the second binary class, generating a second lower portion of the second number of bits based on the lower portion of the first number of bits; wherein
the first lower portion of the second number of bits has more bits than the second lower portion of the second number of bits.

An eighteenth embodiment provides a system (e.g., computer system) comprising:
one or more processors; and
a memory storing instructions that, when executed by at least one processor among the one or more processors, cause the system to perform operations comprising:
accessing first data that corresponds to a segment of media content and is expressed in a first number of bits, an upper portion of the first number of bits having a first data type, a lower portion of the first number of bits having a second data type;
classifying the media content into a binary class among a first binary class and a second binary class;
compressing the first data by generating second data expressed in a second number of bits that are fewer than the first number of bits, the generating of the second data including:
if the media content has the first binary class, generating a first upper portion of the second number of bits by subtracting the upper portion of the first number of bits from a maximum value representable by the second number of bits, the first upper portion having a predetermined first size;
otherwise, if the media content has the second binary class, generating a second upper portion of the second number of bits by adding the upper portion of the first number of bits to a minimum value representable by the second number of bits, the second upper portion having a predetermined second size; and
assigning the generated second data expressed in the second number of bits to the segment of the media content, the first or second upper portion of the second number of bits having the first data type, a lower portion of the second number of bits having the second data type and having a predetermined third size.

A nineteenth embodiment provides a system according to the eighteenth embodiment, wherein:
the classifying of the media content includes comparing a duration of the media content to a threshold duration, the first binary class indicating that the duration of the media content exceeds the threshold duration, the second binary class indicating that the duration of the media content fails to exceed the threshold duration.

A twentieth embodiment provides a system according to the nineteenth embodiment, wherein:
the first predetermined size of the first upper portion of the second number of bits is larger than the second predetermined size of the second upper portion of the second number of bits; and
the compressing of the first data further includes:
if the duration of the media content exceeds the threshold duration, generating the first upper portion of the second number of bits based on the upper portion of the first number of bits;
otherwise, if the duration of the media content fails to exceed the threshold duration, generating the second upper portion of the second number of bits based on the upper portion of the first number of bits; wherein
the first upper portion of the second number of bits has fewer bits than the second upper portion of the second number bits.

A twenty-first embodiment provides a method comprising:
accessing, by one or more processors, first data that corresponds to a segment of media content, the first data being expressed in a first number of bits that are fewer than a second number of bits that express second data that corresponds to the segment of the media content, an upper portion of the second number of bits having a first data type, a lower portion of the second number of bits having a second data type;
parsing, by the one or more processors, the first data into an upper portion of the first number of bits and a lower portion of the first number of bits, the upper portion of the first number of bits having the first data type, the lower portion of the first number of bits having the second data type, the upper portion of the first number of bits having a binary size selected from a predetermined first size and a predetermined second size;
determining, by the one or more processors, a binary class of the media content among the first binary class and a second binary class based on the binary size of the upper portion of the first number of bits;
recovering, by the one or more processors, the upper portion of the second number of bits by:
if the media content has the first binary class, subtracting the upper portion of the first number bits from a maximum value representable by the first number of bits;
otherwise, if the media content has the second binary class, subtracting a minimum value representable by the first number of bits from the upper portion of the first number of bits; and
recovering, by the one or more processors, the lower portion of the second number of bits based on the lower portion of the first number of bits.

A twenty-second embodiment provides a method according to the twenty-first embodiment, wherein:
the recovered upper portion of the second number of bits encodes a media identifier that identifies the media content; and
the recovered lower portion of the second number of bits encodes a location identifier that identifies a location of the segment within the media content.

A twenty-third embodiment provides a method according to the twenty-first embodiment or the twenty-second embodiment, wherein:
the predetermined first size of the upper portion of the first number bits is equal to the predetermined second size of the upper portion of the first number of bits;
the upper portion of the second number of bits is an upper half of the second number of bits and expresses a first numerical value that corresponds to the first data type; and the lower portion of the second number of bits is a lower half of the second number of bits and expresses a second numerical value that corresponds to the second data type.

A twenty-fourth embodiment provides a method according to any of the twenty-first through twenty-third embodiments, wherein:
the second data is a 64-bit entry within a pre-compression hash table;
the recovered upper portion of the second number of bits is a first 32-bit number that identifies the media content;
the recovered lower portion of the second number of bits is a second 32-bit number that identifies a location of the segment within the media content; and
the accessing of the first data is from a post-compression hash table.

A twenty-fifth embodiment provides a method according to the twenty-fourth embodiment, wherein:
the upper portion of the first number of bits identifies the media content;
the lower portion of the first number of bits identifies the segment of the media content; and
the first data is a 32-bit entry within the post-compression hash table.

A twenty-sixth embodiment provides a method according to any of the twenty-first through twenty-fifth embodiments, wherein:
the first binary class indicates that a duration of the media content meets or exceeds a threshold duration; and
the second binary class indicates that the duration of the media content fails to exceed the threshold duration.

A twenty-seventh embodiment provides a method according to any of the twenty-first through twenty-sixth embodiments, further comprising:
indexing a sub-fingerprint of the media content by indexing a fingerprint of the segment of the media content, the indexing of the fingerprint of the segment including assigning the fingerprint of the segment to the accessed first data within a hash table that correlates the accessed first data to the segment of the media content.

A twenty-eighth embodiment provides a method according to any of the twenty-first through twenty-seventh embodiments, wherein:
the minimum value representable by the first number of bits is a string of hexadecimal zero (0x0) values; and
the maximum value representable by the first number of bits is a string of hexadecimal fifteen (0xF) values.

A twenty-ninth embodiment provides a machine-readable medium (e.g., transitory or non-transitory machine-readable medium, such as a non-transitory machine-readable storage medium) comprising instructions that, when executed by one or more processors of a machine, cause the machine to perform operations comprising:
accessing first data that corresponds to a segment of media content, the first data being expressed in a first number of bits that are fewer than a second number of bits that express second data that corresponds to the segment of the media content, an upper portion of the second number of bits having a first data type, a lower portion of the second number of bits having a second data type;
parsing the first data into an upper portion of the first number of bits and a lower portion of the first number of bits, the upper portion of the first number of bits having the first data type, the lower portion of the first number of bits having the second data type, the upper portion of the first number of bits having a binary size selected from a predetermined first size and a predetermined second size;
determining a binary class of the media content among the first binary class and a second binary class based on the binary size of the upper portion of the first number of bits;
recovering the upper portion of the second number of bits by:
if the media content has the first binary class, subtracting the upper portion of the first number bits from a maximum value representable by the first number of bits;
otherwise, if the media content has the second binary class, subtracting a minimum value representable by the first number of bits from the upper portion of the first number of bits; and
recovering the lower portion of the second number of bits based on the lower portion of the first number of bits.

A thirtieth embodiment provides a system comprising:
one or more processors; and
a memory storing instructions that, when executed by at least one processor among the one or more processors, cause the system to perform operations comprising:
accessing first data that corresponds to a segment of media content, the first data being expressed in a first number of bits that are fewer than a second number of bits that express second data that corresponds to the segment of the media content, an upper portion of the second number of bits having a first data type, a lower portion of the second number of bits having a second data type;
parsing the first data into an upper portion of the first number of bits and a lower portion of the first number of bits, the upper portion of the first number of bits having the first data type, the lower portion of the first number of bits having the second data type, the upper portion of the first number of bits having a binary size selected from a predetermined first size and a predetermined second size;
determining a binary class of the media content among the first binary class and a second binary class based on the binary size of the upper portion of the first number of bits;
recovering the upper portion of the second number of bits by:
if the media content has the first binary class, subtracting the upper portion of the first number bits from a maximum value representable by the first number of bits;
otherwise, if the media content has the second binary class, subtracting a minimum value representable by the first number of bits from the upper portion of the first number of bits; and
recovering the lower portion of the second number of bits based on the lower portion of the first number of bits.

A thirty-first embodiment provides a carrier medium carrying machine-readable instructions for controlling a machine to carry out the method of any of the first through fifteenth embodiments or the method of any of the twenty-first through twenty-eighth embodiments.

What is claimed is:
1. A method comprising:
accessing, by one or more processors, first data that corresponds to a segment of media content and is expressed in a first number of bits, an upper portion of the first number of bits having a first data type, a lower portion of the first number of bits having a second data type;
classifying, by the one or more processors, the media content into a binary class among a first binary class and a second binary class;
compressing, by the one or more processors, the first data by generating second data expressed in a second number of bits that are fewer than the first number of bits, the generating of the second data including:

if the media content has the first binary class, generating a first upper portion of the second number of bits by subtracting the upper portion of the first number of bits from a maximum value representable by the second number of bits, the first upper portion having a predetermined first size;

otherwise, if the media content has the second binary class, generating a second upper portion of the second number of bits by adding the upper portion of the first number of bits to a minimum value representable by the second number of bits, the second upper portion having a predetermined second size; and assigning, by the one or more processors, the generated second data expressed in the second number of bits to the segment of the media content, the first or second upper portion of the second number of bits having the first data type, a lower portion of the second number of bits having the second data type and having a predetermined third size.

2. The method of claim 1, wherein:
the first data identifies the segment of the media content;
the upper portion of the first number of bits encodes a media identifier that identifies the media content; and
the lower portion of the first number of bits encodes a location identifier that identifies a location of the segment within the media content.

3. The method of claim 1, wherein:
the predetermined first size of the first upper portion, the predetermined second size of the second upper portion, and the predetermined third size of the lower portion are equal;
the upper portion of the first number of bits is an upper half of the first number of bits and expresses a first numerical value that corresponds to the first data type; and
the lower portion of the first number of bits is a lower half of the first number of bits and expresses a second numerical value that corresponds to the second data type.

4. The method of claim 1, wherein:
the first data is a 64-bit entry within a pre-compression hash table;
the upper portion of the first number of bits is a first 32-bit number that identifies the media content;
the lower portion of the first number of bits is a second 32-bit number that identifies a location of the segment within the media content; and
the assigning of the generated second data to the segment of the media content includes storing the second data in a post-compression hash table.

5. The method of claim 4, wherein:
the first or second upper portion of the second number of bits identifies the media content;
the lower portion of the second number of bits identifies the segment of the media content; and
the second data is a 32-bit entry within the post-compression hash table.

6. The method of claim 1, wherein:
the first predetermined size of the first upper portion of the second number of bits is larger than the second predetermined size of the second upper portion of the second number of bits; and
the compressing of the first data further includes:
if the media content has the first binary class, generating a first lower portion of the second number of bits based on the lower portion of the first number of bits;
otherwise, if the media content has the second binary class, generating a second lower portion of the second number of bits based on the lower portion of the first number of bits; wherein
the first lower portion of the second number of bits has more bits than the second lower portion of the second number of bits.

7. The method of claim 1, wherein:
the classifying of the media content includes comparing a duration of the media content to a threshold duration, the first binary class indicating that the duration of the media content meets or exceeds the threshold duration, the second binary class indicating that the duration of the media content fails to exceed the threshold duration.

8. The method of claim 7, wherein:
the first predetermined size of the first upper portion of the second number of bits is larger than the second predetermined size of the second upper portion of the second number of bits; and
the compressing of the first data further includes:
if the duration of the media content meets or exceeds the threshold duration, generating the first upper portion of the second number of bits based on the upper portion of the first number of bits;
otherwise, if the duration of the media content fails to exceed the threshold duration, generating the second upper portion of the second number of bits based on the upper portion of the first number of bits; wherein
the first upper portion of the second number of bits has fewer bits than the second upper portion of the second number bits.

9. The method of claim 7, wherein:
the compressing of the first data further includes:
if the duration of the media content meets or exceeds the threshold duration, generating a first lower portion of the second number of bits based on the lower portion of the first number of bits;
otherwise, if the duration of the media content fails to exceed the threshold duration, generating a second lower portion of the second number of bits based on the lower portion of the first number of bits; wherein
the first lower portion of the second number of bits has more bits than the second lower portion of the second number of bits.

10. The method of claim 7, further comprising:
determining the threshold duration prior to the classifying of the media content, the determining of the threshold duration including:
generating a histogram of durations of media content stored in a database of media content; and
calculating a predetermined percentile of the durations of media content from the generated histogram, the determined threshold duration representing the predetermined percentile of the durations.

11. The method of claim 10, wherein:
the predetermined percentile is 95%;
the first binary class indicates that the duration of the media content meets or exceeds at least 95% of the durations represented by the histogram; and
the second binary class indicates that the duration of the media content fails to exceed 95% of the durations represented by the histogram.

12. The method of claim 1, wherein:
the second data is a 32-bit number within which the first upper portion of the second number of bits is an 18-bit number that identifies the media content and within which the second upper portion of the second number of bits is a 15-bit number that identifies the media content.

13. The method of claim 1, wherein:
the compressing of the first data further includes:
if the media content has the first binary class, generating a first lower portion of the second number of bits based on the lower portion of the first number of bits;
otherwise, if the media content has the second binary class, generating a second lower portion of the second number of bits based on the lower portion of the first number of bits; and
the second data is a 32-bit number within which the first lower portion of the second number of bits is a 14-bit number that identifies a location of the segment within the media content and within which the second lower portion of the second number of bits is a 17-bit number that identifies the location of the segment within the media content.

14. The method of claim 1, further comprising:
indexing a sub-fingerprint of the media content by indexing a fingerprint of the segment of the media content, the indexing of the fingerprint of the segment including assigning the fingerprint of the segment to the generated second data within a hash table that correlates the generated second data to the segment of the media content.

15. The method of claim 1, wherein:
the minimum value representable by the second number of bits is a string of hexadecimal zero (0x0) values; and
the maximum value representable by the second number of bits is a string of hexadecimal fifteen (0xF) values.

16. A non-transitory machine-readable storage medium comprising instructions that, when executed by one or more processors of a machine, cause the machine to perform operations comprising:
accessing first data that corresponds to a segment of media content and is expressed in a first number of bits, an upper portion of the first number of bits having a first data type, a lower portion of the first number of bits having a second data type;
classifying the media content into a binary class among a first binary class and a second binary class;
compressing the first data by generating second data expressed in a second number of bits that are fewer than the first number of bits, the generating of the second data including:
if the media content has the first binary class, generating a first upper portion of the second number of bits by subtracting the upper portion of the first number of bits from a maximum value representable by the second number of bits, the first upper portion having a predetermined first size;
otherwise, if the media content has the second binary class, generating a second upper portion of the second number of bits by adding the upper portion of the first number of bits to a minimum value representable by the second number of bits, the second upper portion having a predetermined second size; and
assigning the generated second data expressed in the second number of bits to the segment of the media content, the first or second upper portion of the second number of bits having the first data type, a lower portion of the second number of bits having the second data type and having a predetermined third size.

17. The non-transitory machine-readable storage medium of claim 16, wherein:
the first predetermined size of the first upper portion of the second number of bits is larger than the second predetermined size of the second upper portion of the second number of bits; and
the compressing of the first data further includes:
if the media content has the first binary class, generating a first lower portion of the second number of bits based on the lower portion of the first number of bits;
otherwise, if the media content has the second binary class, generating a second lower portion of the second number of bits based on the lower portion of the first number of bits; wherein
the first lower portion of the second number of bits has more bits than the second lower portion of the second number of bits.

18. A system comprising:
one or more processors; and
a memory storing instructions that, when executed by at least one processor among the one or more processors, cause the system to perform operations comprising:
accessing first data that corresponds to a segment of media content and is expressed in a first number of bits, an upper portion of the first number of bits having a first data type, a lower portion of the first number of bits having a second data type;
classifying the media content into a binary class among a first binary class and a second binary class;
compressing the first data by generating second data expressed in a second number of bits that are fewer than the first number of bits, the generating of the second data including:
if the media content has the first binary class, generating a first upper portion of the second number of bits by subtracting the upper portion of the first number of bits from a maximum value representable by the second number of bits, the first upper portion having a predetermined first size;
otherwise, if the media content has the second binary class, generating a second upper portion of the second number of bits by adding the upper portion of the first number of bits to a minimum value representable by the second number of bits, the second upper portion having a predetermined second size; and
assigning the generated second data expressed in the second number of bits to the segment of the media content, the first or second upper portion of the second number of bits having the first data type, a lower portion of the second number of bits having the second data type and having a predetermined third size.

19. The system of claim 18, wherein:
the classifying of the media content includes comparing a duration of the media content to a threshold duration, the first binary class indicating that the duration of the media content exceeds the threshold duration, the second binary class indicating that the duration of the media content fails to exceed the threshold duration.

20. The system of claim 19, wherein:
the first predetermined size of the first upper portion of the second number of bits is larger than the second predetermined size of the second upper portion of the second number of bits; and the compressing of the first data further includes:
  if the duration of the media content exceeds the threshold duration, generating the first upper portion of the second number of bits based on the upper portion of the first number of bits;
  otherwise, if the duration of the media content fails to exceed the threshold duration, generating the second upper portion of the second number of bits based on the upper portion of the first number of bits; wherein
  the first upper portion of the second number of bits has fewer bits than the second upper portion of the second number bits.

* * * * *